(12) United States Patent
Zhang et al.

(10) Patent No.: US 11,971,786 B2
(45) Date of Patent: Apr. 30, 2024

(54) BACKUP PROCESSING METHOD AND SERVER

(71) Applicant: HUAWEI TECHNOLOGIES CO., LTD., Shenzhen (CN)

(72) Inventors: Lei Zhang, Chengdu (CN); Maopeng Xu, Chengdu (CN); Xianglin Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 17/678,258

(22) Filed: Feb. 23, 2022

(65) Prior Publication Data

US 2022/0179749 A1 Jun. 9, 2022

Related U.S. Application Data

(63) Continuation of application No. PCT/CN2020/088880, filed on May 7, 2020.

(30) Foreign Application Priority Data

Aug. 28, 2019 (CN) .......................... 201910802426.1

(51) Int. Cl.
G06F 11/14 (2006.01)
G06F 9/48 (2006.01)
G06F 9/50 (2006.01)

(52) U.S. Cl.
CPC ........ G06F 11/1458 (2013.01); G06F 9/4881 (2013.01); G06F 9/5027 (2013.01); G06F 11/1448 (2013.01)

(58) Field of Classification Search
CPC ........ G06F 3/0619; G06F 3/065; G06F 3/067; G06F 9/4881; G06F 9/5027; G06F 9/5038; G06F 11/1448; G06F 11/1456; G06F 11/1458; G06F 11/1464; G06F 11/1469; G06F 11/3409
See application file for complete search history.

(56) References Cited

U.S. PATENT DOCUMENTS 7,548,898 B1 *  6/2009  Tarenskeen ........... G06F 16/214
7,650,341 B1 *  1/2010  Oratovsky .......... G06F 11/1469
                                                        707/999.01
9,753,672 B1    9/2017  Bachu et al.
(Continued)

FOREIGN PATENT DOCUMENTS

CN          103036946 A       4/2013
CN          104142871 A       11/2014
(Continued)

*Primary Examiner* — Aracelis Ruiz
(74) *Attorney, Agent, or Firm* — Maier & Maier, PLLC

(57) ABSTRACT

A backup processing method and a server are provided. The method is applied to a backup system, and the backup system includes a plurality of backup servers. The method includes: dividing, by a master backup server in the plurality of backup servers, a backup task into a plurality of child backup tasks; allocating, by the master backup server, each child backup task to each of the plurality of backup servers; and sending, by the master backup server, the plurality of child backup tasks to respective corresponding backup servers. According to this method, a data backup rate can be improved.

12 Claims, 10 Drawing Sheets

(56) References Cited

U.S. PATENT DOCUMENTS

| | | | | |
|---|---|---|---|---|
| 2004/0213586 A1* | 10/2004 | Gu | ................... | H04B 10/2507 |
| | | | | 398/203 |
| 2010/0293329 A1* | 11/2010 | Wang | ................. | G06F 11/1469 |
| | | | | 711/E12.001 |
| 2017/0185490 A1* | 6/2017 | Sridharan | ............. | G06F 3/0604 |
| 2021/0064264 A1* | 3/2021 | Bajaj | .................... | G06F 3/0673 |
| 2021/0240575 A1* | 8/2021 | Mulheren | ........... | G06F 11/1456 |
| 2021/0263770 A1* | 8/2021 | Liu | ...................... | G06F 3/0607 |

FOREIGN PATENT DOCUMENTS

| | | |
|---|---|---|
| CN | 106648979 A | 5/2017 |
| CN | 106708661 A | 5/2017 |
| CN | 107729177 A | 2/2018 |
| CN | 107741890 A | 2/2018 |
| CN | 109144783 A | 1/2019 |
| CN | 109408280 A | 3/2019 |
| CN | 109951662 A | 6/2019 |
| CN | 110597659 A | 12/2019 |

\* cited by examiner

BACKUP PROCESSING METHOD AND SERVER

CROSS-REFERENCE TO RELATED APPLICATIONS

This application is a continuation of International Application No. PCT/CN2020/088880, filed on May 7, 2020, which claims priority to Chinese Patent Application No. 201910802426.1, filed on Aug. 28, 2019. The disclosures of the aforementioned applications are hereby incorporated by reference in their entireties.

FIELD

The embodiments relate to the field of data backup technologies, a backup processing method, and a server.

BACKGROUND

In the cloud computing and big data era, data that needs to be backed up has more various forms, for example, a to-be-backed-up 256 TB ultra-large logical unit number (LUN) on a storage array, a to-be-backed-up multi-server active-active cluster system based on shared storage, such as an Oracle real application cluster (Oracle RAC), and a to-be-backed-up distributed data system serving a big data system, such as a Cassandra database. Characteristics of these production systems include: (1) There is a large amount of data to be backed up for a single object at a time. (2) A production system of a to-be-backed-up object is a multi-server system. (3) To-be-backed-up data is distributed differently on a plurality of servers. (4) Servers in the production system correspond to different load.

For example, for an existing data backup method, refer to FIG. 1. FIG. 1 is a schematic diagram of an architecture of a system applicable to an existing backup method. It can be learned from FIG. 1 that, there are different amounts of data on all production servers, but in the existing backup method, an equal amount of to-be-backed-up data is simply required to be obtained from each production server for backup. This leads to internal data forwarding between production servers in a production system and increases processing load of the production server and affects a data backup rate. In addition, it can be further learned from FIG. 1 that, in the existing backup method, only one backup server in a backup system is used to back up data in the production system, and other backup servers are idle. This causes a waste of resources and a low backup rate.

In conclusion, how to fully use resources to improve a data backup rate is a problem that needs to be resolved by a person skilled in the art.

SUMMARY

Embodiments disclose a backup processing method and a server, to avoid a waste of resources and improve a data backup rate.

According to a first aspect, an embodiment provides a backup processing method. The method is applied to a backup system, and the backup system includes one or more master backup servers and one or more slave backup servers. The method includes:

A master backup server in a plurality of backup servers divides a backup task into a plurality of child backup tasks. The master backup server allocates each child backup task to each of the plurality of backup servers. The master backup server sends the plurality of child backup tasks to respective corresponding backup servers.

In a possible implementation, the master backup server obtains first preset information, where the first preset information includes one or more of first data distribution information and first resource consumption information, the first data distribution information includes a first distribution status of to-be-backed-up data in a production system, the production system includes a plurality of production servers, and the first resource consumption information includes first resource consumption statuses respectively corresponding to the plurality of production servers. The master backup server obtains the plurality of child backup tasks through division based on the first preset information, where the child backup task corresponds to a backup execution server and a production execution server and is used to indicate the backup execution server to back up to-be-backed-up data in a target range in the production execution server, the backup execution server includes a backup server in the backup system, and the production execution server includes one or more production servers in the production system. The master backup server sends the plurality of child backup tasks to respective corresponding backup execution servers.

Compared with the conventional technology in which when information about the production system is unknown, according to a simple balancing policy, an equal amount of to-be-backed-up data is required to be obtained from each production server for backup, in this embodiment, the backup task of the data in the entire production system is divided into the plurality of child backup tasks based on analysis results/an analysis result of pre-obtained data distribution information and/or pre-obtained resource consumption information in the production system, where each child backup task corresponds to a range of data that the child backup task is responsible for backing up. Then, the child backup tasks are distributed to the respective corresponding backup execution server for data backup. Therefore, backup efficiency can be improved and load of the production server can be reduced. In addition, compared with the conventional technology in which only one backup server in the backup system is used to back up the data in the entire production system, in this embodiment, each backup server in the backup system is fully used to back up the data, so that backup efficiency is greatly improved.

In a possible implementation, the first preset information includes the first data distribution information, and that the master backup server obtains the plurality of child backup tasks through division based on the first preset information includes: The master backup server obtains the plurality of child backup tasks through division based on the first data distribution information, where the to-be-backed-up data in the target range includes data determined based on a distribution status that is of the to-be-backed-up data in the production execution server and that is in the first data distribution information.

In this embodiment, because information about to-be-backed-up data on each production server in the production system is obtained, when the to-be-backed-up data is obtained, only to-be-backed-up data in a target production server may be required to be obtained from the server. This avoids a problem in the conventional technology in which to-be-backed-up data needs to be obtained from another production server to be sent to the backup server, so that internal forwarding between the production servers is avoided, and processing load of the production server is reduced. In addition, a backup rate can be improved because information does not need to be obtained from another server.

In a possible implementation, the first preset information includes the first resource consumption information, and that the master backup server obtains the plurality of child backup tasks through division based on the first preset information includes: The master backup server obtains the plurality of child backup tasks through division based on the first resource consumption information, where the child backup task includes information about one or more initial backup rates, the one or more initial backup rates are initial backup rates that are correspondingly set based on one or more resource consumption statuses that are of one or more production servers corresponding to the child backup task and that are in the first resource consumption information, and the information about the initial backup rate is used to indicate to obtain, at the initial backup rate, data from a production server corresponding to the initial backup rate.

In this embodiment, a rate at which the backup server obtains the to-be-backed-up data from the production server may be set based on a resource consumption status of the production server. A lower rate may be set when a larger quantity of resources of the production server are consumed. A higher rate may be set when a smaller quantity of resources of the production server are consumed. Therefore, in this embodiment, it can be effectively ensured that a backup task is completed without affecting a production service of the production server.

In a possible implementation, after the master backup server sends the plurality of child backup tasks to the respective corresponding backup execution servers, the method further includes: The master backup server obtains second preset information, where the second preset information includes one or more of second data distribution information, second resource consumption information, and health status information of a server, the second data distribution information includes a second distribution status of to-be-backed-up data in the production system, the second resource consumption information includes second resource consumption statuses respectively corresponding to the plurality of production servers, and the health status information of the server includes one or more of a health status of the production server in the production system and a health status of the backup server in the backup system. The master backup server generates adjustment information for a target child backup task based on the second preset information when learning, through analysis based on the second preset information, that the target child backup task in the plurality of child backup tasks needs to be adjusted, where the adjustment information is used to indicate a backup execution server corresponding to the target child backup task to back up data based on the adjustment information. The master backup server sends the adjustment information to the backup execution server corresponding to the target child backup task.

In this embodiment, the master backup server may obtain information such as a data distribution status and a resource consumption status in the production system in real time, and then analyze a change relationship between the newly obtained information and previously obtained information. If information about the corresponding production server changes, the master backup server may corresponding generate adjustment information, so that the corresponding backup execution server adjusts a backup parameter (for example, a range of to-be-backed-up data or a backup rate) based on the adjustment information. According to this embodiment, the backup parameter in a backup process can be adjusted in real time, to ensure that both a production process and a backup process can be successively performed.

In a possible implementation, the second preset information includes the second data distribution information, and that the master backup server generates adjustment information for a target child backup task based on the second preset information when learning, through analysis based on the second preset information, that the target child backup task in the plurality of child backup tasks needs to be adjusted includes: When learning, through analysis based on the second data distribution information, that a range of to-be-backed-up data that corresponds to the target child backup task changes, the master backup server generates, based on a data distribution status that is of a production execution server corresponding to the target child backup task and that is in the second data distribution information, an adjusted range that is of the to-be-backed-up data and that corresponds to the target child backup task.

In this embodiment, the range that is of the to-be-backed-up data and that corresponds to the child backup task may be adjusted based on the newly obtained data distribution information, to ensure that the to-be-backed-up data can be completely obtained.

In a possible implementation, the second preset information includes the second resource consumption information, and that the master backup server generates adjustment information for a target child backup task based on the second preset information when learning, through analysis based on the second preset information, that the target child backup task in the plurality of child backup tasks needs to be adjusted includes: When learning, through analysis based on the second resource consumption information, that a resource consumption status of a production execution server corresponding to the target child backup task changes, the master backup server generates an adjusted back rate for the target child backup task based on a resource consumption status that is of the production execution server corresponding to the target child backup task and that is in the second resource consumption information.

In this embodiment, the backup rate for the child backup task may be adjusted based on the newly obtained resource consumption information. If the backup rate is decreased, it is ensured that the data is backed up without affecting production. If the backup rate is increased, resources can be fully used to improve the backup rate.

In a possible implementation, the second preset information includes the health status information of the server, and that the master backup server generates adjustment information for a target child backup task based on the second preset information when learning, through analysis based on the second preset information, that the target child backup task in the plurality of child backup tasks needs to be adjusted includes: If the health status information of the server includes the health status of the production server in the production system, when learning, through analysis based on the health status of the production server in the production system, that the production execution server corresponding to the target child backup task is faulty, the master backup server generates, based on the health status of the production server in the production system, information about an adjusted production execution server corresponding to the target child backup task. If the health status information of the server includes the health status of the backup server in the backup system, when learning, through analysis based on the health status of the backup server in the backup system, that the backup execution server corresponding to the target child backup task is faulty, the master backup server generates, based on the health status of the backup server in the backup system, information about a corresponding adjusted backup execution server corresponding to the target child backup task.

In this embodiment, when the production execution server or the backup execution server is faulty, a production server or a backup server that normally runs may be replaced to continue to complete a corresponding backup task, so as to ensure that a backup task of data can be successively completed and avoid incomplete data backup caused by the fault.

In a possible implementation, after the master backup server sends the plurality of child backup tasks to the respective corresponding backup execution servers, the method further includes: The master backup server sends, based on a first child backup task, a request for obtaining to-be-backed-up data to a first production execution server, where the request for obtaining to-be-backed-up data includes information about a range of the to-be-backed-up data, a backup execution server corresponding to the first child backup task is the master backup server, and a production execution server corresponding to the first child backup task is the first production execution server. The master backup server receives the to-be-backed-up data sent by the first production execution server.

In this embodiment, the master backup server may also execute the child backup task to obtain the to-be-backed-up data from the production server for backup, so that resources of the server are fully used, and a backup rate is improved.

In a possible implementation, the request for obtaining to-be-backed-up data further includes information about a first initial backup rate, the information about the first initial backup rate is initial backup rate information included in the first child backup task, and that the master backup server receives the to-be-backed-up data sent by the first production execution server includes: The master backup server receives, at the first initial backup rate, the to-be-backed-up data sent by the first production execution server.

In a possible implementation, after the master backup server sends, based on the first child backup task, the request for obtaining to-be-backed-up data to the first production execution server, the method further includes: The master backup server correspondingly adjusts, based on first adjustment information, the request for obtaining to-be-backed-up data, where an adjusted request for obtaining to-be-backed-up data includes one or more of information about an adjusted range of to-be-backed-up data, information about an adjusted backup rate, and address information of an adjusted production execution server, and the first adjustment information is used to indicate the master backup server to back up data based on the first adjustment information. The master backup server sends the adjusted request for obtaining to-be-backed-up data to the production execution server corresponding to the first child backup task.

According to a second aspect, an embodiment provides a backup processing method. The method is applied to a backup system, and the backup system includes one or more master backup servers and one or more slave backup servers. The method includes:

A first backup server receives a child backup task sent by the master backup server, where the child backup task corresponds to a production execution server and is used to indicate the first backup server to back up to-be-backed-up data in a target range in the production execution server, the production execution server is a server in a production system, and the first backup server is a server in the backup system. The first backup server sends, based on the child backup task, a request for obtaining to-be-backed-up data to the production execution server, where the request for obtaining to-be-backed-up data includes information about a range of the to-be-backed-up data. The first backup server receives the to-be-backed-up data sent by the production execution server.

According to a third aspect, an embodiment provides a backup processing method. The method is applied to a production system, and the production system includes a plurality of production servers. The method includes:

A first production server obtains first preset information, where the first preset information includes one or more of first data distribution information and first resource consumption information, the first data distribution information includes a first distribution status of to-be-backed-up data on the first production server, and the first resource consumption information includes a first resource consumption status of the first production server. The first production server sends the first preset information to a master backup server, where the first preset information is used to enable the master backup server to obtain a plurality of child backup tasks through division based on the first preset information, the child backup task corresponds to a backup execution server and a production execution server and is used to indicate the backup execution server to back up to-be-backed-up data in a target range in the production execution server, the master backup server is a server in a backup system, and the backup system includes one or more master backup servers and one or more slave backup servers that are configured to back up data in the production system.

According to a fourth aspect, an embodiment provides a backup and restoration processing method. The method is applied to a backup system, and the backup system includes one or more master backup servers and one or more slave backup servers. The method includes:

A master backup server in a plurality of backup servers divides a backup and restoration task into a plurality of child backup and restoration tasks. The master backup server allocates each child backup and restoration task to each of the plurality of backup servers. The master backup server sends the plurality of child backup and restoration tasks to respective corresponding backup servers.

According to a fifth aspect, an embodiment provides a backup and restoration processing method. The method is applied to a backup system, and the backup system includes one or more master backup servers and one or more slave backup servers. The method includes:

A first backup server receives a child backup and restoration task sent by the master backup server, where the child backup and restoration task corresponds to a production execution server and is used to indicate the first backup server to send data in a preset range to the production execution server, the production execution server is a server in a production system, and the first backup server is a slave backup server in the backup system. The first backup server sends the data in the preset range to the production execution server based on the child backup and restoration task.

According to a sixth aspect, an embodiment provides a backup and restoration processing method. The method is applied to a production system, and the production system includes a plurality of production servers. The method includes:

A first production server obtains first information, where the first information includes third resource consumption statuses respectively corresponding to the plurality of production servers. The first production server sends the first information to a master backup server, where the first information is used to enable the master backup server to obtain a plurality of child backup and restoration tasks through division based on the first information, the child backup and restoration task corresponds to a backup execution server and a production execution server and is used to indicate the backup execution server to send data in a preset range to the production execution server, the master backup server is a server in a backup system, and the backup system includes one or more master backup servers and one or more slave backup servers.

According to a seventh aspect, an embodiment provides a backup processing server. The backup processing server is a master backup server in a backup system, the backup system further includes one or more slave backup servers, and the backup processing server includes a processor, a memory, and a communications module. The memory and the communications module are coupled to the processor, the memory stores a computer program, and when executing the computer program, the processor performs the following operations:

obtaining first preset information, where the first preset information includes one or more of first data distribution information and first resource consumption information, the first data distribution information includes a first distribution status of to-be-backed-up data in a production system, the production system includes a plurality of production servers, and the first resource consumption information includes first resource consumption statuses respectively corresponding to the plurality of production servers; obtaining a plurality of child backup tasks through division based on the first preset information, where the child backup task corresponds to a backup execution server and a production execution server and is used to indicate the backup execution server to back up to-be-backed-up data in a target range in the production execution server, the backup execution server includes a backup server in the backup system, and the production execution server includes one or more production servers in the production system; and sending the plurality of child backup tasks to respective corresponding backup execution servers by using the communications module.

According to an eighth aspect, an embodiment provides a backup processing server. The backup processing server is a slave backup server in a backup system, the backup system includes one or more master backup servers and one or more slave backup servers, and the backup processing server includes a processor, a memory, and a communications module. The memory and the communications module are coupled to the processor, the memory stores a computer program, and when executing the computer program, the processor performs the following operations:

receiving, by using the communications module, a child backup task sent by the master backup server, where the child backup task corresponds to a production execution server and is used to indicate the processor to back up to-be-backed-up data in a target range in the production execution server, and the production execution server is a server in a production system; sending, based on the child backup task by using the communications module, a request for obtaining to-be-backed-up data to the production execution server, where the request for obtaining to-be-backed-up data includes information about a range of the to-be-backed-up data; and receiving, by using the communications module, the to-be-backed-up data sent by the production execution server.

According to a ninth aspect, an embodiment provides a backup processing server. The backup processing server is a production server in a production system, and the backup processing server includes a processor, a memory, and a communications module. The memory and the communications module are coupled to the processor, the memory stores a computer program, and when executing the computer program, the processor performs the following operations:

obtaining first preset information, where the first preset information includes one or more of first data distribution information and first resource consumption information, the first data distribution information includes a first distribution status of to-be-backed-up data on the backup processing server, and the first resource consumption information includes a first resource consumption status of the backup processing server; and sending the first preset information to a master backup server by using the communications module, where the first preset information is used to enable the master backup server to obtain a plurality of child backup tasks through division based on the first preset information, the child backup task corresponds to a backup execution server and a production execution server and is used to indicate the backup execution server to back up to-be-backed-up data in a target range in the production execution server, the master backup server is a server in a backup system, and the backup system includes one or more master backup servers and one or more slave backup servers that are configured to back up data in the production system.

According to a tenth aspect, an embodiment provides a backup processing server. The backup processing server is a master backup server in a backup system, the backup system further includes one or more slave backup servers, and the backup processing server includes:

a division unit, configured to divide a backup task into a plurality of child backup tasks; an allocation unit, configured to allocate each child backup task to each of a plurality of backup servers; and a sending unit, configured to send the plurality of child backup tasks to respective corresponding backup servers.

According to an eleventh aspect, an embodiment provides a backup processing server. The backup processing server is a slave backup server in a backup system, and the backup system includes one or more master backup servers and one or more slave backup servers. The backup processing server includes: a receiving unit, configured to receive a child backup task sent by the master backup server, where the child backup task corresponds to a production execution server and is used to indicate the backup processing server to back up to-be-backed-up data in a target range in the production execution server, and the production execution server is a server in a production system; and a sending unit, configured to send, based on the child backup task, a request for obtaining to-be-backed-up data to the production execution server, where the request for obtaining to-be-backed-up data includes information about a range of the to-be-backed-up data. The receiving unit is further configured to receive the to-be-backed-up data sent by the production execution server.

According to a twelfth aspect, an embodiment provides a backup processing server. The backup processing server is a production server in a production system, and the backup processing server includes:
- an obtaining unit, configured to obtain first preset information, where the first preset information includes one or more of first data distribution information and first resource consumption information, the first data distribution information includes a first distribution status of to-be-backed-up data on the backup processing server, and the first resource consumption information includes a first resource consumption status of the backup processing server; and a sending unit, configured to send the first preset information to a master backup server, where the first preset information is used to enable the master backup server to obtain a plurality of child backup tasks through division based on the first preset information, the child backup task corresponds to a backup execution server and a production execution server and is used to indicate the backup execution server to back up to-be-backed-up data in a target range in the production execution server, the master backup server is a server in a backup system, and the backup system includes one or more master backup servers and one or more slave backup servers that are configured to back up data in the production system.

According to a thirteenth aspect, an embodiment provides a backup and restoration processing server. The backup and restoration processing server is a master backup server in a backup system, the backup system includes one or more master backup servers and one or more slave backup servers, and the backup and restoration processing server includes a processor, a memory, and a communications module. The memory and the communications module are coupled to the processor, the memory stores a computer program, and when executing the computer program, the processor performs the following operations:
- obtaining first information, where the first information includes third resource consumption statuses respectively corresponding to a plurality of production servers in a production system;
- obtaining a plurality of child backup and restoration tasks through division based on the first information, where the child backup and restoration task corresponds to a backup execution server and a production execution server and is used to indicate the backup execution server to send data in a preset range to the production execution server, the backup execution server includes a backup server in the backup system, and the production execution server includes one or more production servers in the production system; and
- sending the plurality of child backup and restoration tasks to respective corresponding backup execution servers by using the communications modules.

According to a fourteenth aspect, an embodiment provides a backup and restoration processing server. The backup and restoration processing server is a slave backup server in a backup system, the backup system includes one or more master backup servers and one or more slave backup servers, and the backup and restoration processing server includes a processor, a memory, and a communications module. The memory and the communications module are coupled to the processor, the memory stores a computer program, and when executing the computer program, the processor performs the following operations:
- receiving, by using the communications module, a child backup and restoration task sent by the master backup server, where the child backup and restoration task corresponds to a production execution server and is used to indicate the backup and restoration processing server to send data in a preset range to the production execution server, the production execution server is a server in a production system, and the backup and restoration processing server is a slave backup server in the backup system; and
- sending the data in the preset range to the production execution server based on the child backup and restoration task by using the communications module.

In a possible implementation, the child backup and restoration task includes an initial backup and restoration rate, and processor is configured to:
- send the data in the preset range to the production execution server at the initial backup and restoration rate based on the child backup and restoration task by using the communications module.

According to a fifteenth aspect, an embodiment provides a backup and restoration processing server. The backup and restoration processing server is a production server in a production system, and the backup and restoration processing server includes a processor, a memory, and a communications module. The memory and the communications module are coupled to the processor, the memory stores a computer program, and when executing the computer program, the processor performs the following operations:
- obtaining first information, where the first information includes third resource consumption statuses respectively corresponding to a plurality of production servers; and
- sending the first information to a master backup server by using the communications module, where the first information is used to enable the master backup server to obtain a plurality of child backup and restoration tasks through division based on the first information, the child backup and restoration task corresponds to a backup execution server and a production execution server and is used to indicate the backup execution server to send data in a preset range to the production execution server, the master backup server is a server in a backup system, and the backup system includes one or more master backup servers and one or more slave backup servers.

According to a sixteenth aspect, an embodiment provides a backup and restoration processing server. The backup and restoration processing server is a master backup server in a backup system, the backup system includes one or more master backup servers and one or more slave backup servers, and the backup and restoration processing server includes:
- a division unit, configured to divide a backup and restoration task into a plurality of child backup and restoration tasks; an allocation unit, configured to allocate each child backup and restoration task to each of a plurality of backup servers; and a sending unit, configured to send the plurality of child backup and restoration tasks to respective corresponding backup servers.

In a possible implementation, the backup and restoration processing server further includes an obtaining unit, configured to obtain first information, where the first information includes third resource consumption statuses respectively corresponding to a plurality of production servers in a production system; and
- the division unit is further configured to obtain the plurality of child backup and restoration tasks through division based on the first information, where the child backup and restoration task corresponds to a backup execution server and a production execution server and is used to indicate the backup execution server to send data in a preset range to the production execution server, the backup execution server includes a backup server in the backup system, and the production execution server includes one or more production servers in the production system.

According to a seventeenth aspect, an embodiment provides a backup and restoration processing server. The backup and restoration processing server is a slave backup server in a backup system, the backup system includes one or more master backup servers and one or more slave backup servers, and the backup and restoration processing server includes:
- a receiving unit, configured to receive a child backup and restoration task sent by the master backup server, where the child backup and restoration task corresponds to a production execution server and is used to indicate the backup and restoration processing server to send data in a preset range to the production execution server, the production execution server is a server in a production system, and the backup and restoration processing server is a slave backup server in the backup system; and
- a sending unit, configured to send the data in the preset range to the production execution server based on the child backup and restoration task.

According to an eighteenth aspect, an embodiment provides a backup and restoration processing server. The backup and restoration processing server is a production server in a production system, and the backup and restoration processing server includes:
- an obtaining unit, configured to obtain first information, where the first information includes third resource consumption statuses respectively corresponding to the plurality of production servers; and
- a sending unit, configured to send the first information to a master backup server, where the first information is used to enable the master backup server to obtain a plurality of child backup and restoration tasks through division based on the first information, the child backup and restoration task corresponds to a backup execution server and a production execution server and is used to indicate the backup execution server to send data in a preset range to the production execution server, the master backup server is a server in a backup system, and the backup system includes one or more master backup servers and one or more slave backup servers.

According to a nineteenth aspect, an embodiment provides a backup processing system. The system includes a production system and a backup system, the production system includes a plurality of production servers, and the backup system includes one or more master backup servers and one or more slave backup servers. The master backup server is the server according to any one of the seventh aspect and the possible implementations of the seventh aspect, the slave backup server is the server according to any one of the eighth aspect and the possible implementations of the eighth aspect, and the production server is the server according to any one of the ninth aspect and the possible implementations of the ninth aspect.

According to a twentieth aspect, an embodiment provides a backup processing system. The system includes a production system and a backup system, the production system includes a plurality of production servers, and the backup system includes one or more master backup servers and one or more slave backup servers. The master backup server is the server according to any one of the tenth aspect and the possible implementations of the tenth aspect, the slave backup server is the server according to any one of the eleventh aspect and the possible implementations of the eleventh aspect, and the production server is the server according to any one of the twelfth aspect and the possible implementations of the twelfth aspect.

According to a twenty-first aspect, an embodiment provides a backup and restoration processing system. The system includes a production system and a backup system, the production system includes a plurality of production servers, and the backup system includes one or more master backup servers and one or more slave backup servers. The master backup server is the server according to any one of the thirteenth aspect and the possible implementations of the thirteenth aspect, the slave backup server is the server according to any one of the fourteenth aspect and the possible implementations of the fourteenth aspect, and the production server is the server according to any one of the fifteenth aspect and the possible implementations of the fifteenth aspect.

According to a twenty-second aspect, an embodiment provides a backup and restoration processing system. The system includes a production system and a backup system, the production system includes a plurality of production servers, and the backup system includes one or more master backup servers and one or more slave backup servers. The master backup server is the server according to any one of the sixteenth aspect and the possible implementations of the sixteenth aspect, the slave backup server is the server according to any one of the seventeenth aspect and the possible implementations of the seventeenth aspect, and the production server is the server according to any one of the eighteenth aspect and the possible implementations of the eighteenth aspect.

According to a twenty-third aspect, an embodiment provides a computer readable storage medium. The computer readable storage medium stores a computer program, and the computer program is executed by a processor to implement the method according to any one of the first aspect and the possible implementations of the first aspect.

According to a twenty-fourth aspect, an embodiment provides a computer readable storage medium. The computer readable storage medium stores a computer program, and the computer program is executed by a processor to implement the method according to any one of the second aspect and the possible implementations of the second aspect.

According to a twenty-fifth aspect, an embodiment provides a computer readable storage medium. The computer readable storage medium stores a computer program, and the computer program is executed by a processor to implement the method according to any one of the third aspect and the possible implementations of the third aspect.

According to a twenty-sixth aspect, an embodiment provides a computer readable storage medium. The computer readable storage medium stores a computer program, and the computer program is executed by a processor to implement the method according to any one of the fourth aspect and the possible implementations of the fourth aspect.

According to a twenty-seventh aspect, an embodiment provides a computer readable storage medium. The computer readable storage medium stores a computer program, and the computer program is executed by a processor to implement the method according to any one of the fifth aspect and the possible implementations of the fifth aspect.

According to a twenty-eighth aspect, an embodiment provides a computer readable storage medium. The computer readable storage medium stores a computer program, and the computer program is executed by a processor to implement the method according to any one of the sixth aspect and the possible implementations of the sixth aspect.

According to a twenty-ninth aspect, an embodiment provides a computer program product. The computer program product is read and executed by a computer to implement the method according to any one of the first aspect and the possible implementations of the first aspect, the method according to any one of the second aspect and the possible implementations of the second aspect, or the method according to any one of the third aspect and the possible implementations of the third aspect.

According to a thirtieth aspect, an embodiment provides a computer program product. The computer program product is read and executed by a computer to implement the method according to any one of the fourth aspect and the possible implementations of the fourth aspect, the method according to any one of the fifth aspect and the possible implementations of the fifth aspect, or the method according to any one of the sixth aspect and the possible implementations of the sixth aspect.

According to a thirty-first aspect, an embodiment provides a computer program. When the computer program is executed on a computer, the computer is enabled to implement the method according to any one of the first aspect and the possible implementations of the first aspect, the method according to any one of the second aspect and the possible implementations of the second aspect, or the method according to any one of the third aspect and the possible implementations of the third aspect.

According to a thirty-second aspect, an embodiment provides a computer program. When the computer program is executed on a computer, the computer is enabled to implement the method according to any one of the fourth aspect and the possible implementations of the fourth aspect, the method according to any one of the fifth aspect and the possible implementations of the fifth aspect, or the method according to any one of the sixth aspect and the possible implementations of the sixth aspect.

According to a thirty-third aspect, an embodiment provides an apparatus. The apparatus includes a processor and a communications interface, and the apparatus is configured to perform the method according to any one of the first aspect and the possible implementations of the first aspect, the method according to any one of the second aspect and the possible implementations of the second aspect, or the method according to any one of the third aspect and the possible implementations of the third aspect.

In a possible implementation, the apparatus is a chip or a system on chip (SoC).

According to a thirty-fourth aspect, an embodiment provides an apparatus. The apparatus includes a processor and a communications interface, and the apparatus is configured to perform the method according to any one of the fourth aspect and the possible implementations of the fourth aspect, the method according to any one of the fifth aspect and the possible implementations of the fifth aspect, or the method according to any one of the sixth aspect and the possible implementations of the sixth aspect.

In a possible implementation, the apparatus is a chip or a system on chip (SoC).

In conclusion, embodiments provide a backup processing method. Compared with the conventional technology in which when information about a production system is unknown, according to a simple balancing policy, an equal amount of to-be-backed-up data is required to be obtained from each production server for backup, and consequently internal consumption caused by forwarding between production servers is heavy and performance of the server deteriorates, in the embodiments, a backup task of data in an entire production system is divided into a plurality of child backup tasks based on analysis results/an analysis result of pre-obtained data distribution information and/or pre-obtained resource consumption information in the production system, where each child backup task corresponds to a range of data that the child backup task is responsible for backing up. Then, the child backup tasks are distributed to respective corresponding backup execution server for data backup. Therefore, backup efficiency can be improved and load of the production server can be reduced. In addition, compared with the conventional technology in which only one backup server in a backup system is used to back up the data in the entire production system, in this embodiment, each backup server in the backup system is fully used to back up the data, so that backup efficiency is greatly improved.

In addition, embodiments further provide a backup and restoration processing method. In the embodiments, a range of to-be-restored data sent to a corresponding production server is determined based on a resource consumption status of each of production servers, and the backup and restoration task is divided into a plurality of child tasks and the plurality of child tasks are distributed to a plurality of servers in a backup system for execution. Therefore, backup and restoration efficiency is improved without affecting production.

BRIEF DESCRIPTION OF DRAWINGS

Accompanying drawings used in embodiments are described below.

DETAILED DESCRIPTION OF THE EMBODIMENTS

The following describes the embodiments with reference to the accompanying drawings.

The following first describes a system architecture used in a backup processing method in the embodiments, to better understand the backup processing method and a related server that are provided in the embodiments. An architecture of a system shown in FIG. 2 may include a production system 201 and a backup system 202. The production system 201 includes a plurality of production servers, and the backup system 202 includes a plurality of backup servers.

The production system 201 in this embodiment may be each of production systems in various industries, and these production systems may be used to produce data, store data, or the like. The plurality of production servers included in the production system 201 may have respective tasks and may produce or store different data. A storage type of data in the production system 201 may be a shared storage type or a dispersed storage type.

The backup system 202 in this embodiment is configured to obtain the data from the production system 201 for backup. The plurality of backup servers included in the backup system 202 may separately back up the data in the production system 201.

Figure 2:
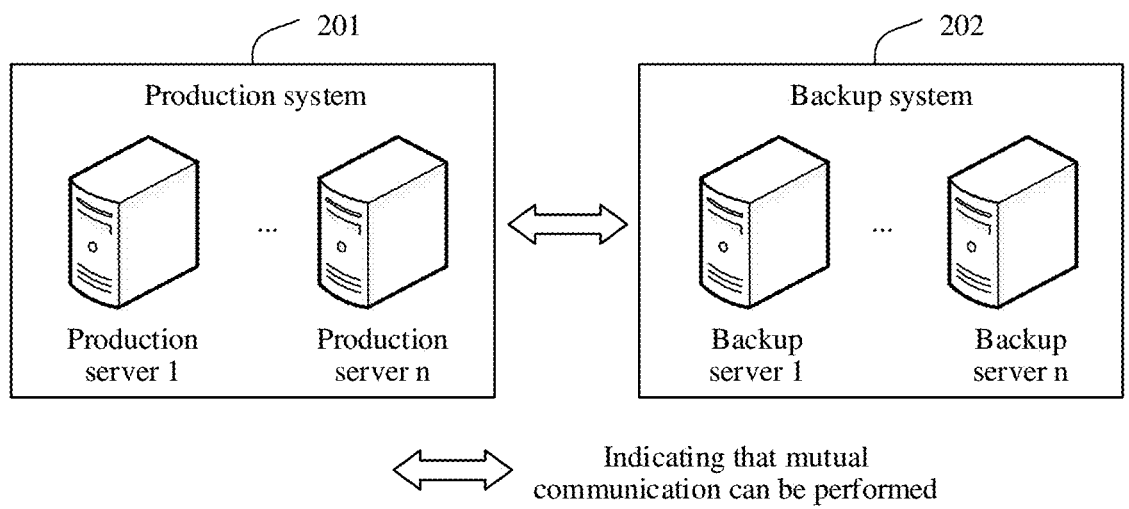
FIG. 2 is a schematic diagram of an architecture of a backup system according to an embodiment.

It should be noted that the system architecture used in the backup processing method provided in the embodiments is not limited to the architecture of the system shown in FIG. 2.

The following describes, in detail with reference to the accompanying drawings, a backup processing method provided in an embodiment.

Figure 3:
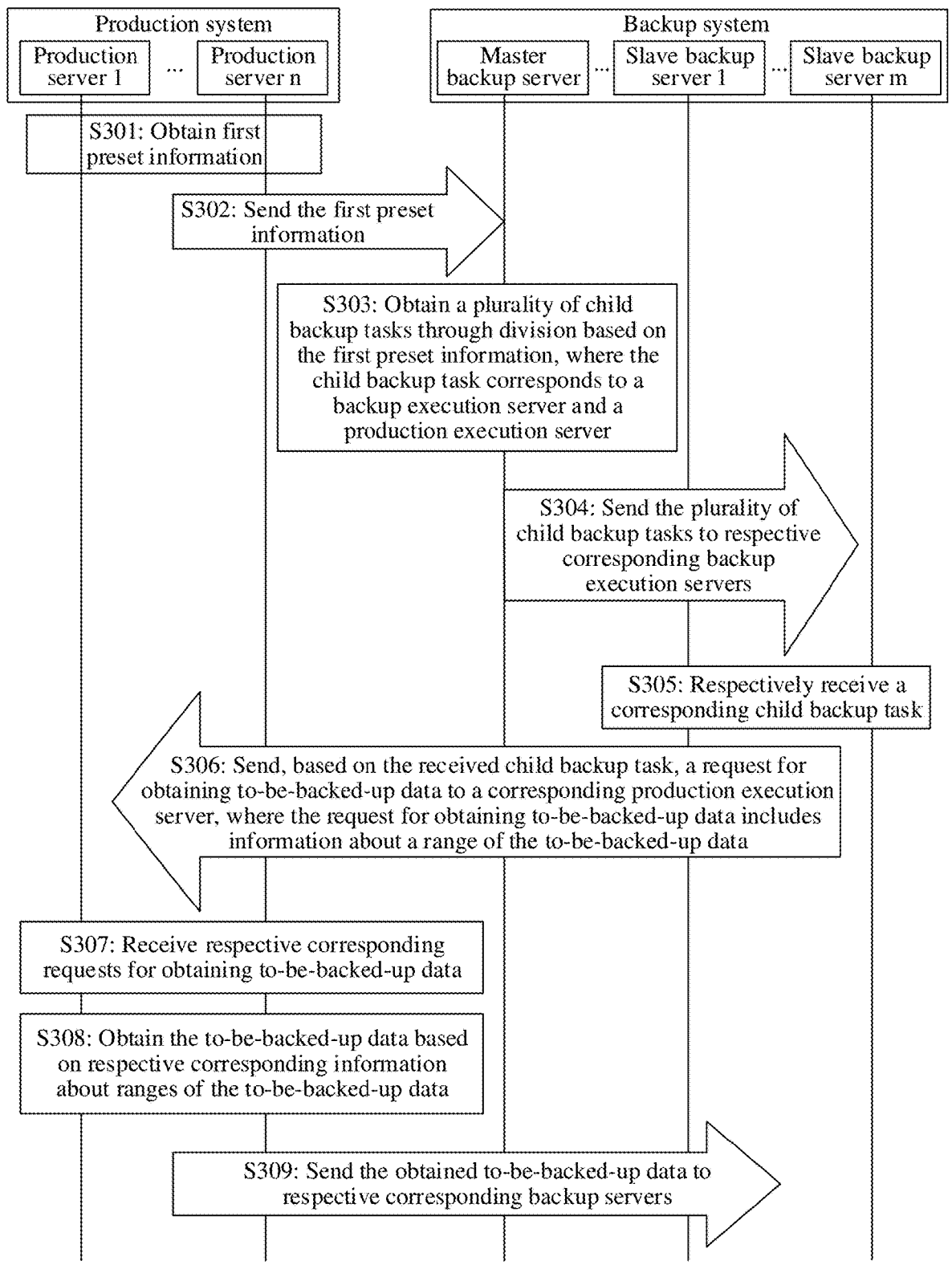
FIG. 3 is a schematic interaction flowchart of a backup processing method according to an embodiment.

FIG. 3 shows a backup processing method according to an embodiment. The method may be implemented based on the architecture of the system shown in FIG. 2. The method includes but is not limited to the following steps.

Step 301: A production server in a production system obtains first preset information.

Step 302: The production system sends the first preset information to a master backup server.

In an embodiment, the production system usually includes a plurality of production servers. Before backing up data in the production system, the production server may first obtain the first preset information in the production system, learn of one or more of a data distribution status in the production system and a resource consumption status of the production server through analysis based on the first preset information, and the like.

In addition, a backup system includes a plurality of backup servers, where one or more backup servers are master backup servers, and other backup servers are slave backup servers. The master backup server is mainly configured to execute a parent backup task. The slave backup server is mainly configured to execute a child backup task. The master backup server may also execute the child backup task. The parent backup task is mainly used to obtain the first preset information in the production system, obtain a plurality of child backup tasks through division based on the first preset information, and distribute the plurality of child backup tasks to corresponding backup servers. The child backup task is mainly used to indicate a corresponding backup server to obtain to-be-backed-up data from a corresponding production server for storage and backup. The parent backup task and the child backup task are described in detail below. Details are not described herein.

In a possible implementation, the one or more master backup servers may be any one or more of the plurality of backup servers in the backup system, and a master backup server may be determined based on a situation. This is not limited in this solution.

It should be noted that the following describes, by using one master backup server as an example, the backup processing method provided in this embodiment. If there are a plurality of master backup servers in the backup system, a function implemented by another master backup server may be the same as a function implemented by the one master backup server. Details are not described in the embodiments.

In a possible implementation, the first preset information may include first data distribution information; the first preset information may include first resource consumption information; or the first preset information may include first data distribution information and first resource consumption information.

The first data distribution information may include a distribution status of to-be-backed-up data in the production system at a moment at which the first data distribution information is generated. The first data distribution information may indicate information such as a capacity of data that needs to be backed up in each production server in the production system and a file name of the data that needs to be backed up in each production server in the production system.

The first resource consumption information may include a resource consumption status of each production server in the production system at a moment at which the first resource consumption information is generated. The resource consumption status may include processor CPU usage, memory usage, and network bandwidth, and may further include a status of transactions per second (TPS).

In a possible implementation, the first preset information may further include storage type information of data in the production system, for example, dispersed storage information or shared storage information.

In a possible implementation, the first preset information obtained by the production server in the production system may indicate that the production servers in the production system obtain respective information after receiving an obtaining instruction of the master backup server, and then send the respective information to the master backup server, or may indicate that a device or an apparatus outside the production system centrally collects information from a production server in the production system, and finally obtains the first preset information, and a production server in the production system centrally sends the first preset information to the master backup server.

Step 303: The master backup server obtains the plurality of child backup tasks through division based on the first preset information, where the child backup task corresponds to a backup execution server and a production execution server.

In an embodiment, the child backup task is used to indicate the corresponding backup execution server to back up to-be-backed-up data in a target range in the corresponding production execution server. A backup execution server corresponding to each child backup task may include one backup server in the backup system, and a production execution server corresponding to each child backup task may include one or more production servers in the production system.

In an embodiment, the master backup server analyzes the obtained first preset information and obtains the plurality of child backup tasks through division based on the analysis result. Each child backup task obtained through division may correspond to a child task identifier (ID), information about a backup server (that is, the backup execution server) that executes the child task, information about a production server (that is, the production execution server) on which to-be-backed-up data that needs to be obtained based on the child task is located, and information about a range of the to-be-backed-up data that needs to be obtained based on the child task (for example, information such as a capacity of the to-be-backed-up data and a corresponding file name). Optionally, each child backup task obtained through division may further correspond to information about an initial backup rate for the child task and the like. The initial backup rate may be used to indicate a backup execution server corresponding to the child task to obtain the to-be-backed-up data from a corresponding production execution server at the initial backup rate.

Optionally, the information about the production server may include one or more of a name, a media access control address, and an internet protocol address of the server. The information about the backup server may include one or more of a name, a media access control address, and an internet protocol address of the server.

In a possible implementation, there may be one backup execution server corresponding to each child backup task obtained through division. There may be one or more production execution servers corresponding to each child backup task obtained through division, that is, the child task may be responsible for obtaining data that needs to be backed up from only one production server for backup, or the child task may be responsible for respectively obtaining to-be-backed-up data in a plurality of production servers from the plurality of production servers for backup.

Step 304: The master backup server sends the plurality of child backup tasks to respective corresponding backup execution servers.

In an embodiment, because each of the plurality of child backup tasks obtained by the master backup server through division corresponds to a backup execution server, the master backup server sends the plurality of child backup tasks to corresponding backup execution servers based on information about the backup execution server corresponding to each of the plurality of child backup tasks. The backup execution server herein may be a slave backup server.

Step 305: Each of slave backup servers in the backup system receives a corresponding child backup task.

Step 306: The slave backup server in the backup system sends, based on the received child backup task, a request for obtaining to-be-backed-up data to a corresponding production execution server, where the request for obtaining to-be-backed-up data includes information about a range of the to-be-backed-up data.

For ease of understanding, the following describes, by using one backup execution server (which may be a slave backup server) as an example, an operation performed by the backup execution server after the backup execution server receives the child backup task. An operation performed by another backup execution server after the backup execution server receives a child backup task may be the same as the operation performed by the backup execution server.

In an embodiment, there may be one or more child backup tasks received by the backup execution server. If each child backup task corresponds to one production execution server, the backup execution server may obtain to-be-backed-up data from one or more production execution servers for backup. An example in which the backup execution server receives a child backup task is used below for description.

After receiving the child backup task, the backup execution server may obtain, from the child backup task, the information about the corresponding production execution server and the information about the range of the to-be-backed-up data that needs to be obtained from the corresponding production execution server. After obtaining the information, the backup execution server generates, based on the information, a request for obtaining to-be-backed-up data, where the request may carry the information about the range of the to-be-backed-up data that needs to be obtained from the corresponding production execution server, and then the backup execution server sends the request to the corresponding production execution server.

Optionally, the child backup task received by the backup execution server may further include information about an initial backup rate, and the information is used to indicate the backup execution server to obtain the to-be-backed-up data from the corresponding production execution server at the initial backup rate for backup. In this case, the request for obtaining to-be-backed-up data that is generated by the backup execution server may further carry the information about the initial backup rate, so that the corresponding production execution server sends the to-be-backed-up data to the backup execution server based on the initial backup rate.

Optionally, if one child backup task corresponds to a plurality of production execution servers, the one child backup task also correspondingly includes information about ranges of to-be-backed-up data that needs to be obtained from the plurality of production execution servers, and/or correspondingly includes a plurality of initial backup rates at which to-be-backed-up data is obtained from the plurality of production execution servers.

Step 307: The production servers in the production system receive respective corresponding requests for obtaining to-be-backed-up data.

Step 308: The production servers in the production system obtain the to-be-backed-up data based on respective corresponding information about ranges of the to-be-backed-up data.

Step 309: The production server in the production system sends the obtained to-be-backed-up data to respective corresponding backup servers.

An example in which one production server performs an operation after receiving the request for obtaining to-be-backed-up data is used below for description. An operation performed by another production server after the production server receives the request for obtaining to-be-backed-up data is the same as the operation performed by the one production server.

After receiving the request for obtaining to-be-backed-up data, the production server parses the request to obtain information about a range of the to-be-backed-up data, obtains the to-be-backed-up data based on the information about the range, and then sends the obtained to-be-backed-up data to the corresponding backup server.

In a possible implementation, if the request for obtaining to-be-backed-up data further carries the information about the initial backup rate, the production server parses the request and then obtains the information about the backup rate and sends the obtained to-be-backed-up data to the corresponding backup server at the backup rate.

Optionally, if data in the production system in which the production server is located is of a shared storage type, the production server may obtain data in a corresponding range in the request from a shared memory in the production system and send the data to the corresponding backup execution server.

Optionally, if data in the production system in which the production server is located is of a dispersed storage type, that is, the data in the production system is stored in each production server in a distributed manner, the production server may obtain data in a corresponding range in the request from a memory of the production execution server and send the data to the corresponding backup execution server.

In a possible implementation, the master backup server may also be used as a backup execution server corresponding to a child backup task. The master backup server may distribute one or more child backup tasks to the master backup server for execution. After step 304 of sending the plurality of child backup tasks to the respective corresponding backup execution servers, the master backup server sends, based on the one or more child backup tasks, the request for obtaining to-be-backed-up data to the corresponding production execution server, where the request for obtaining to-be-backed-up data includes information about a range of the to-be-backed-up data, and then receives the to-be-backed-up data sent by the corresponding production execution server for backup. For an implementation of obtaining the to-be-backed-up data from the production server in this embodiment, refer to the corresponding descriptions in step 305 to step 309. Details are not described herein again.

In a possible implementation, the first preset information includes the first data distribution information, and that the master backup server obtains the plurality of child backup tasks through division based on the first preset information includes: The master backup server obtains the plurality of child backup tasks through division based on the first data distribution information, where the to-be-backed-up data in the target range includes data determined based on a distribution status that is of the to-be-backed-up data in the production execution server and that is in the first data distribution information.

In an embodiment, if the first preset information includes the first data distribution information, that is, includes information such as a capacity and a file name that are of corresponding to-be-backed-up data in each production server in the production system, the master backup server may determine, based on the information such as the capacity and the file name that are of the corresponding to-be-backed-up data in each production server in the production system, ranges of data that the plurality of child backup tasks are responsible for backing up.

For ease of understanding, an example is used for description. For details, refer to Table 1.

TABLE 1

| Name of a production server | Capacity of to-be-backed-up data | File names of the to-be-backed-up data |
|---|---|---|
| Production server 1 | 100 G | File_1, File_2, . . . |
| Production server 2 | 300 G | File_3, File_4, . . . |
| Production server 3 | 500 G | File_5, File_6, . . . |
| Production server 4 | 800 G | File_7, File_8, . . . |

Table 1 shows, in a form of a table, an example of information about the capacity and the file name that are of the corresponding to-be-backed-up data in each production server in the production system. It is assumed that the production system includes four production servers: the production server 1, the production server 2, the production server 3, and the production server 4, and the four production servers respectively correspond to capacities 100 G, 300 G, 500 G, and 800 G of the to-be-backed-up data. In addition, Table 1 further correspondingly shows file names of to-be-backed-up data in the four production servers. For example, file names of to-be-backed-up data in the production server 1 include File_1 and File_2. Because there may be many file names, the file names are not listed one by one.

It should be noted that the to-be-backed-up data may be a file or may be all other data that needs to be backed up, such as record information or cache information. A format and a form that are of the to-be-backed-up data are not limited, and data in various formats and forms is backed up based on a situation. This is not limited in this solution.

Assuming that the first preset information includes the information in Table 1, the master backup server may obtain the plurality of child backup tasks through division based on the information in Table 1 and determine a range of data for which each child task is responsible. The following provides examples of manners of obtaining the child tasks through division based on the information in Table 1.

Manner 1: The master backup server may obtain four child backup tasks through division based on the information in Table 1. It is assumed that child task IDs allocated by the master backup server to the four child tasks may be respectively a child task 1, a child task 2, a child task 3, and a child task 4. Then, the master backup server respectively correspondingly allocates to-be-backed-up data in a production server 1, a production server 2, a production server 3, and a production server 4 to the child task 1, the child task 2, the child task 3, and the child task 4 for backup. Production execution servers may be in a one-to-one correspondence with the child task 1, the child task 2, the child task 3, and the child task 4 are respectively the production server 1, the production server 2, the production server 3, and the production server 4. Assuming that the backup system includes a backup server 1, a backup server 2, a backup server 3, a backup server 4, and the like, the master backup server may allocate the child task 1, the child task 2, the child task 3, and the child task 4 to the backup server 1, the backup server 2, the backup server 3, and the backup server 4 in a one-to-one correspondence manner for execution. Backup execution servers corresponding to the child task 1, the child task 2, the child task 3, and the child task 4 may be the backup server 1, the backup server 2, the backup server 3, and the backup server 4. For information included in each child task obtained after the allocation, refer to Table 2.

TABLE 2

| Child task ID | Corresponding backup execution server | Corresponding production execution server | Range of to-be-backed-up data that needs to be obtained |
|---|---|---|---|
| Child task 1 | Backup server 1 | Production server 1 | 100 G, File_1, File_2, . . . |
| Child task 2 | Backup server 2 | Production server 2 | 300 G, File_3, File_4, . . . |
| Child task 3 | Backup server 3 | Production server 3 | 500 G, File_5, File_6, . . . |
| Child task 4 | Backup server 4 | Production server 4 | 800 G, File_7, File_8, . . . |

In manner 1, each child task corresponds to one backup execution server and one production execution server. When backup servers in the backup system are sufficient, a manner of obtaining child tasks through division in manner 1 may be used, to fully use the backup server and avoid a waste of resources. However, when the backup servers are not in a one-to-one correspondence with production servers to perform data backup, one backup server may correspond to a plurality of production servers to perform data backup. For example, for details, refer to a manner of obtaining child tasks through division in Manner 2.

Manner 2: Assuming that the backup system includes only three backup servers: a backup server 1, a backup server 2, and a backup server 3, the master backup server may obtain three child backup tasks through division based on the information in Table 1. It is assumed that child task IDs allocated by the master backup server to the three child tasks may be respectively a child task 1, a child task 2, and a child task 3. Then, the master backup server respectively correspondingly allocates to-be-backed-up data in a production server 1 and a production server 2 to the child task 1 and the child task 2 for backup and allocates to-be-backed-up data in a production server 3 and a production server 4 to the child task 3 for backup. Production execution servers respectively corresponding to the child task 1 and the child task 2 may be the production server 1 and the production server 2, and production execution servers corresponding to the child task 3 are the production server 3 and the production server 4. Then, the master backup server may correspondingly allocate the child task 1, the child task 2, and the child task 3 to the backup server 1, the backup server 2, and the backup server 3 for execution. Backup execution servers corresponding to the child task 1, the child task 2, and the child task 3 may be respectively the backup server 1, the backup server 2, and the backup server 3. For information included in each child task obtained after the allocation, refer to Table 3.

TABLE 3

| Child task ID | Corresponding backup execution server | Corresponding production execution server | Range of to-be-backed-up data that needs to be obtained |
|---|---|---|---|
| Child task 1 | Backup server 1 | Production server 1 | 100 G, File_1, File_2, . . . |
| Child task 2 | Backup server 2 | Production server 2 | 300 G, File_3, File_4, . . . |
| Child task 3 | Backup server 3 | Production server 3 and production server 4 | 500 G, File_5, File_6, . . . , and 800 G, File_7, File_8, . . . |

It should be noted that the manner of obtaining child tasks through division in Manner 2 is not necessarily used when the backup servers are not in the one-to-one correspondence with the production servers to perform data backup, or may be used in another case, for example, when the production server 3 and the production server 4 have relatively small amounts of data that needs to be backed up. The manner of obtaining child tasks through division in Manner 2 is used when a backup server 3 can completely implement data backup quickly. Certainly, the manner of obtaining child tasks through division in Manner 2 may also be used in another case. Details are not described herein.

If a production server has a relatively large amount of to-be-backed-up data, one backup server may not be able to back up all the data. In this case, a plurality of backup servers may be allocated to correspondingly back up the data in the production server. For example, for details, refer to a manner of obtaining child tasks through division in Manner 3.

Manner 3: The master backup server may obtain five child backup tasks through division based on the information in Table 1. It is assumed that child task IDs allocated by the master backup server to the five child tasks may be respectively a child task 1, a child task 2, a child task 3, a child task 4, and a child task 5. Then, the master backup server respectively correspondingly allocates to-be-backed-up data in a production server 1, a production server 2, and a production server 3 to the child task 1, the child task 2, and the child task 3 for backup, and allocates to-be-backed-up data in a production server 4 to the child task 4 and the child task 5 for backup. Production execution servers that are in a one-to-one correspondence with the child task 1, the child task 2, the child task 3, the child task 4, and the child task 5 may be respectively the production server 1, the production server 2, the production server 3, the production server 4, and the production server 4. Assuming that the backup system includes a backup server 1, a backup server 2, a backup server 3, a backup server 4, a backup server 5, and the like, the master backup server may correspondingly allocate the child task 1, the child task 2, the child task 3, the child task 4, and the child task 5 to the backup server 1, the backup server 2, the backup server 3, the backup server 4, and the backup server 5 for execution. Backup execution servers may respectively correspond to the child task 1, the child task 2, the child task 3, the child task 4, and the child task 5 are the backup server 1, the backup server 2, the backup server 3, the backup server 4, and the backup server 5. For information included in each child task obtained after the allocation, refer to Table 4.

TABLE 4

| Child task ID | Corresponding backup execution server | Corresponding production execution server | Range of to-be-backed-up data that needs to be obtained |
|---|---|---|---|
| Child task 1 | Backup server 1 | Production server 1 | 100 G, File_1, File_2, . . . |
| Child task 2 | Backup server 2 | Production server 2 | 300 G, File_3, File_4, . . . |
| Child task 3 | Backup server 3 | Production server 3 | 500 G, File_5, File_6, . . . |
| Child task 4 | Backup server 4 | Production server 4 | 300 G, File_7, . . . |
| Child task 5 | Backup server 5 | Production server 4 | 500 G, File_8, . . . |

For how to determine ranges of to-be-backed-up data for which the child task 4 and the child task 5 are responsible, in one manner, the ranges may be determined based on performance of backup execution servers respectively corresponding to the child task 4 and the child task 5. For example, performance of the backup server 4 is worse (CPU usage is 80% and memory usage is 70%), and performance of the backup server 5 is better (CPU usage is 20% and memory usage is 30%). In this case, a smaller part (for example, 300 G) of the to-be-backed-up data in the production server 4 may be allocated to the child task 4 for backup, and a larger part (for example, 500 G) of the to-be-backed-up data in the production server 4 may be allocated to the child task 5 for backup. In the other manner, random allocation or even allocation may also be performed. Herein, only an example is used for description. An allocation manner in an embodiment may be determined based on a situation. This is not limited in this solution.

In Manner 3, the child task 4 corresponds to two backup execution servers. Two backup servers may be used to back up to-be-backed-up data in one production server, to fully use resources to improve backup efficiency.

It should be noted that the foregoing describes only an example of the manner of obtaining child tasks through division. A backup execution server corresponding to the child task, a production execution server corresponding to the child task, and a range of data that needs to be backed up for the child task may be determined based on a situation. This is not limited in this solution.

In a possible implementation, the first preset information includes the first resource consumption information, and that the master backup server obtains the plurality of child backup tasks through division based on the first preset information includes: The master backup server obtains the plurality of child backup tasks through division based on the first resource consumption information, where the child backup task includes information about one or more initial backup rates, the one or more initial backup rates are initial backup rates that are correspondingly set based on one or more resource consumption statuses that are of one or more production servers corresponding to the child backup task and that are in the first resource consumption information, and the information about the initial backup rate is used to indicate to back up, at the initial backup rate, data from a production server corresponding to the initial backup rate.

In an embodiment, the first preset information obtained by the master backup server includes only the first resource consumption information, that is, includes processor (CPU) usage, memory usage, and network bandwidth that correspond to each production server in the production system when the first resource consumption information is obtained, and may further include a status of transactions per second (TPS) and the like. In this case, the master backup server may obtain the child backup tasks through division based on the obtained first resource consumption information.

If a production server occupies more CPUs and/or uses more memory, it indicates that load of the production server is heavier. If a production server has lower network bandwidth and/or fewer transactions per second, it indicates that performance of the production server is worse. If the master backup server knows a range and a total amount of data that needs to be backed up in the production system, but does not know a range and an amount of to-be-backed-up data in each production server in the production system, when obtaining the child backup tasks through division, the master backup server may correspondingly allocate a smaller range and a smaller amount of to-be-backed-up data to a production server with heavier load and/or worse performance, and may correspondingly allocate a larger range and a larger amount of to-be-backed-up data to a production server with lighter load and/or better performance.

For ease of understanding, an example is used below for description. Table 5 shows an example of a resource consumption status of each production server in the production system.

TABLE 5

| Name of a production server | CPU usage | Memory usage | Network bandwidth | Transactions per second |
| --- | --- | --- | --- | --- |
| Production server 1 | 10% | 50% | 100 M | 2000 |
| Production server 2 | 35% | 40% | 50 M | 1000 |

TABLE 5-continued

| Name of a production server | CPU usage | Memory usage | Network bandwidth | Transactions per second |
| --- | --- | --- | --- | --- |
| Production server 3 | 50% | 55% | 20 M | 500 |
| Production server 4 | 75% | 65% | 10 M | 200 |

It may be found by analyzing the information in Table 5 that the production server 1, the production server 2, the production server 3, and the production server 4 correspond to load in ascending order and performance in descending order. It is assumed that a known amount of data that needs to be backed up in the production system is 1000 G, and 1000 G includes 1000 files, such as File-1, File-2, File-3, . . . , and File-1000. Assuming that a capacity of each file is 1 G, the master backup server may obtain the child backup tasks through division based on the analysis result. For information included in each child task obtained after the division, refer to Table 6.

TABLE 6

| Child task ID | Corresponding backup execution server | Corresponding production execution server | Range of to-be-backed-up data that needs to be obtained |
| --- | --- | --- | --- |
| Child task 1 | Backup server 1 | Production server 1 | 450 G, File__1, File__2, . . . , and File__450 |
| Child task 2 | Backup server 2 | Production server 2 | 300 G, File__451, File__452, . . . , and File__750 |
| Child task 3 | Backup server 3 | Production server 3 | 200 G, File__751, File__752, . . . , and File__950 |
| Child task 4 | Backup server 4 | Production server 4 | 50 G, File__951, File__952, . . . , and File__1000 |

In Table 6, the master backup server may obtain four child tasks through division, where each child task corresponds to one production server. It is assumed that task IDs of the four child tasks are respectively the child task 1, the child task 2, the child task 3, and the child task 4. Production execution servers corresponding to the child task 1, the child task 2, the child task 3, and the child task 4 may be respectively the production server 1, the production server 2, the production server 3, and the production server 4. Backup execution servers corresponding to the child task 1, the child task 2, the child task 3, and the child task 4 may be respectively the backup server 1, the backup server 2, the backup server 3, and the backup server 4. Because the production server 1, the production server 2, the production server 3, and the production server 4 correspond to load in ascending order and performance in descending order, when the master backup server obtains the child backup tasks through division, to-be-backed-up data that is allocated to the child task 1, the child task 2, the child task 3, and the child task 4 and that is obtained from the production server 1, the production server 2, the production server 3, and the production server 4 that respectively correspond to the child task 1, the child task 2, the child task 3, and the child task 4 corresponds to ranges in descending order, for example, may respectively correspond to "450 G, File_1, File_2, . . . , and File_450", "300 G, File_451, File_452, . . . , and File_750", "200 G, File_751, File_752, . . . , and File_950", and "50 G, File_951, File_952, . . . , and File_1000".

It should be noted that a range of to-be-backed-up data that needs to be obtained based on each child task obtained through division in Table 6 is merely an example or may be obtained through division in another proportion. For example, ranges of to-be-backed-up data that needs to be obtained that respectively correspond to the child task 1, the child task 2, the child task 3, and the child task 4 may be "500 G, File_1, File_2, . . . , and File_500", "250 G, File_501, File_452, . . . , and File_750", "200 G, File_751, File_752, . . . , and File_950", and "50 G, File_951, File_952, . . . , and File_1000". A division proportion is determined based on a situation. This is not limited in this solution.

In a possible embodiment, the master backup server may obtain, through division based on the first resource consumption information, a range of data that the child backup task is responsible for backing up and may further determine an initial backup rate for each child backup task based on the first resource consumption information.

For ease of understanding of this embodiment, an example is used below for description.

Still refer to Table 5 and Table 6. In Table 5, the production server 1, the production server 2, the production server 3, and the production server 4 correspond to load in ascending order and performance in descending order. Therefore, when initial backup rates for the corresponding Child task 1, the corresponding Child task 2, the corresponding Child task 3, and the corresponding Child task 4 in Table 6 are determined, the initial backup rates for the child task 1, the child task 2, the child task 3, and the child task 4 may be gradually slowed down in an order of the child task 1, the child task 2, the child task 3, and the child task 4.

For example, an initial backup rate for the child task 1 may be set to 1 megabit per second, an initial backup rate for the child task 2 may be set to 500 bits per second, an initial backup rate for the child task 3 may be set to 200 bits per second, and an initial backup rate for the child task 4 may be set to 100 bits per second.

Alternatively, an initial backup rate for each child backup task may be determined by setting a threshold. For example, if CPU usage of the production server is less than or equal to 20%, and network bandwidth of the production server is greater than or equal to 100 M, an initial rate for a child backup task corresponding to the production server may be set to 1 megabit per second. If CPU usage of the production server is greater than 20% and less than or equal to 40%, and network bandwidth of the production server is less than 100 M and greater than or equal to 50 M, an initial rate for a child backup task corresponding to the production server may be set to 500 bits per second. If CPU usage of the production server is greater than 40% and less than 60%, and network bandwidth of the production server is less than 50 M and greater than or equal to 20 M, an initial rate for a child backup task corresponding to the production server may be set to 200 bits per second. If CPU usage of the production server is greater than 60%, and network bandwidth of the production server is less than 20 M, an initial rate for a child backup task corresponding to the production server may be set to 100 bits per second. Herein, only an example is used to describe a manner of determining a backup and restoration rate. There is another embodiment of determining the backup and restoration rate. A determining manner is determined based on a situation. This is not limited in this solution.

It should be noted that the example of setting the initial backup rate described above is described when one child backup task corresponds to one production server. If one child backup task corresponds to a plurality of production servers, respective initial backup rates may be set based on respective resource consumption statuses of the plurality of production servers. The child backup task may correspond to a plurality of initial backup rates.

In an embodiment, if the first preset information obtained by the master backup server includes the first data distribution information and the first resource consumption information, the master backup server may obtain, through division based on the first data distribution information, a range of data that each child backup task is responsible for backing up, and then determine an initial backup rate for each child backup task based on the first resource consumption information. For an implementation of obtaining, through division based on the first data distribution information, the range of the data that each child backup task is responsible for backing up, refer to the specific descriptions in Table 1 to Table 4. Details are not described herein again. For an implementation of determining the initial backup rate for each child backup task based on the first resource consumption information, refer to the descriptions in Table 5 to Table 6. Details are not described herein again.

In a possible implementation, after the master backup server receives the first preset information, before an entire backup process is completed, the master backup server obtains latest preset information at an interval of first preset duration, where the latest preset information may include one or more of latest data distribution information and latest resource consumption information in the production system, and may further include a latest health status of each production server in the production system and/or a latest health status of each backup server in the backup system. Then, the master backup server analyzes the information to generate adjustment information for a corresponding child backup task, where the adjustment information is used to adjust some parameters in a backup process, to ensure that a production service of the production server and a backup operation of the backup server can be performed at the same time without affecting production of the production server.

In an embodiment, because production in the production system is always being performed, distribution information of to-be-backed-up data may continuously change, and a resource consumption status also continuously changes. Therefore, in an entire backup process, the master backup server may obtain one or more of a latest data distribution status and a latest resource consumption status from the production system at an interval of first preset duration, to adjust some parameters in the backup process, so as to implement both backup and production. The first preset duration may be 5 minutes, 10 minutes, half an hour, or the like. The first preset duration may be determined based on a situation. This is not limited in this solution.

Optionally, the information obtained by the master backup server at an interval of first preset duration may be obtained through direct interaction with the production system, or may be sent by another device to the master backup server after the another device first obtains the information from the production system.

Figure 4:
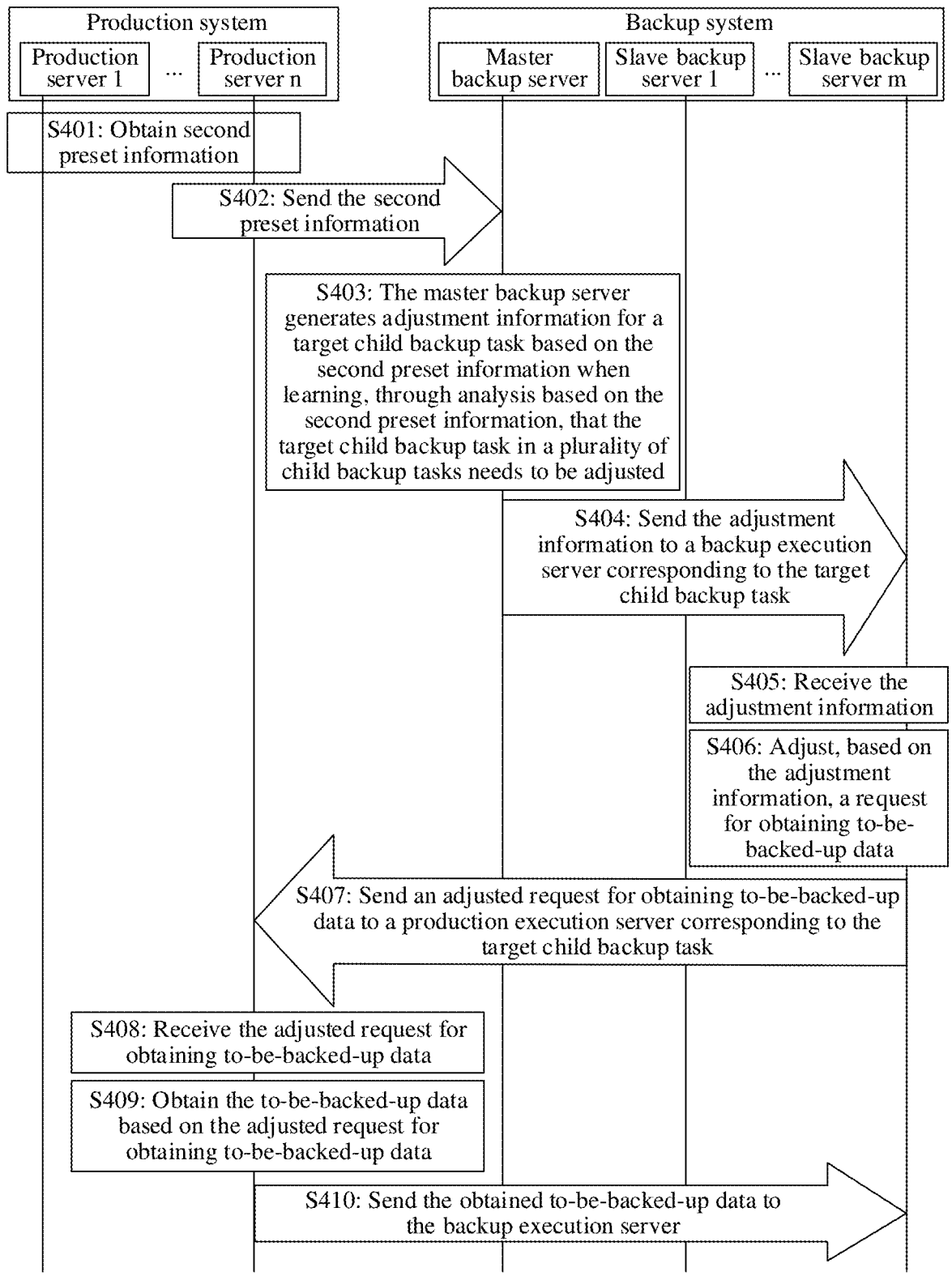
FIG. 4 is a schematic interaction flowchart of a backup processing method according to an embodiment.

The following describes, with reference to FIG. 4 by using an example in which the master backup server obtains second preset information at an interval of the first preset duration after obtaining the first preset information, how to generate adjustment information for a corresponding child backup task based on the information. The second preset information includes one or more of second data distribution information, second resource consumption information, and health status information of a server.

The second data distribution information may include latest data distribution information in the production system, and the information may be data distribution information in the production system at a moment at which the second data distribution information is generated. The second resource consumption information may include latest resource consumption information in the production system, and the information may be resource consumption information in the production system at a moment at which the second resource consumption information is generated. The health status information of the server may include a latest health status of each production server in the production system and/or a latest health status of each backup server in the backup system, and the status may be a health status of each production server in the production system and/or a health status of each backup server in the backup system at a moment at which the health status information of the server is obtained.

It should be noted that a manner of processing information such as the latest data distribution status and the latest resource consumption status in the production system that are obtained at an interval of the first preset duration after the second preset information is obtained may be the same as this manner.

In FIG. 4, the method may include but is not limited to the following steps.

Step 401: The production system obtains second preset information.

Step 402: The production system sends the second preset information to a master backup server.

In an embodiment, a manner in which the production system obtains the second preset information may be the same as a manner in which the production system obtains the first preset information. When the second preset information includes a health status of each production server in the production system and/or a health status of each backup server in the backup system, each production server in the production system may obtain a health status of each production server and send the health status to the master backup server, or a server or a device (for example, a server dedicated to monitoring a health status of each production server in the production system) collects health status information in the production system, and then a server in the production system centrally sends the health status information to the master backup server. In addition, the master backup server may actively collect a health status of each backup server in the backup system. For example, the master backup server may send a health status obtaining request to a backup server, and after receiving the request, the backup server obtains health status information of the backup server and sends the health status information to the master backup server. Alternatively, if the backup system includes a server dedicated to monitoring a health status of each backup server, the master backup server may obtain the health status of each backup server from the server.

Step 403: The master backup server generates adjustment information for a target child backup task based on the second preset information when the master backup server learns, through analysis based on the second preset information, that the target child backup task in a plurality of child backup tasks needs to be adjusted.

Step 404: The master backup server sends the adjustment information to a backup execution server corresponding to the target child backup task.

In a possible implementation, the obtained second preset information includes the second data distribution information, for example, may include information such as a capacity and a file name of to-be-backed-up data in each production server in the production system at a moment at which the second data distribution information is generated. In this case, the master backup server may compare the information with the first data distribution information. The master backup server may correspondingly compare, by using a production server as an object, information about each production server that is included in the second data distribution information with information about each production server that is included in the first data distribution information, that is, compares data obtained by a same production server at different moments, for example, compares information about a first production server that is included in the second data distribution information with information about the first production server that is included in the first data distribution information, and compares information about a second production server that is included in the second data distribution information with information about the second production server that is included in the first data distribution information.

If it is found, after the comparison, that a range (a capacity, a file, and/or the like) of to-be-backed-up data in a production server changes, the master backup server may generate, based on a change status, adjustment information for a child backup task corresponding to the production server, and send the generated adjustment information to a corresponding backup execution server.

For example, in the first data distribution information, a range of to-be-backed-up data in the first production server is a data range with a capacity of 100 G and file names of File_1 and File_2, but in the second data distribution information, a range of to-be-backed-up data in the first production server is a data range with a capacity of 90 G and file names of File_2 and File_3. After the first data distribution information is obtained, before the second data distribution information is obtained, the first production server may also generate File_3 that needs to be backed up, and File_1 has been backed up in this period of time. Therefore, the master backup server may generate an adjusted range of to-be-backed-up data for the child backup task corresponding to the first production server, that is, a data range with a capacity of 90 G and file names of File_2 and File_3. Then, the master backup server sends the adjusted range of the data to a corresponding backup execution server. Herein, only an example is used for description. There is another possible implementation of a range change status. The generated adjusted range of the data may be determined based on a situation. This is not limited in this solution.

In a possible implementation, the obtained second preset information includes the second resource consumption information, that is, includes processor CPU usage, memory usage, and network bandwidth that correspond to each production server in the production system when the second resource consumption information is obtained, and may further include a status of transactions per second (TPS) and the like. In this case, the master backup server may compare the information with the first resource consumption information. The master backup server may correspondingly compare, by using a production server as an object, information about each production server that is included in the second resource consumption information with information about each production server that is included in the first preset resource consumption information, that is, compares data obtained by a same production server at different moments, for example, compares information about a first production server that is included in the second resource consumption information with information about the first production server that is included in the first resource consumption information, and compares information about a second production server that is included in the second resource consumption information with information about the second production server that is included in the first resource consumption information.

If it is found, after the comparison, that a resource consumption status (one or more of CPU usage, memory usage, and network bandwidth) of a production server changes, the master backup server may generate, based on a change status, adjustment information for a child backup task corresponding to the production server, and send the generated adjustment information to a corresponding backup execution server.

For example, in the first resource consumption information, CPU usage of the first production server is 10%, and memory usage of the first production server is 20%, but in the second resource consumption information, CPU usage of the first production server is 50%, and memory usage of the first production server is 60%. After the first resource consumption information is obtained, before the second resource consumption information is obtained, the CPU usage of the first production server increases by 40%, and the memory usage of the first production server increases by 40%. In other words, production load of the first production server increases in this period of time. In this case, to avoid affecting a production service of the first production server, that is, to avoid preempting a resource with the production service, the master backup server may decrease a rate at which the first production server sends to-be-backed-up data to a corresponding backup execution server, then generate an adjusted backup rate for a child backup task corresponding to the first production server and send the adjusted backup rate to the corresponding backup execution server. Herein, only an example is used for description. There is another possible embodiment. The adjusted backup rate may be determined based on a situation. This is not limited in this solution.

In addition, if it is found, after the comparison, that load of the first production server is reduced, to fully use resources of the production server and improve utilization, the master backup server may increase a rate at which the first production server sends to-be-backed-up data to a corresponding backup execution server, then generate an adjusted backup rate for a child backup task corresponding to the first production server, and send the adjusted backup rate to the corresponding backup execution server.

Optionally, an adjusted backup rate may be determined by setting a threshold. For example, after the master backup server compares the two obtained resource consumption statuses, if CPU usage of the production server increases by 10% to 20%, and memory usage of the production server increases by 10% to 20%, the master backup server may decrease a rate at which the first production server sends to-be-backed-up data to a corresponding backup execution server by 20%. Assuming that an initial backup rate is 1 megabit per second, the initial backup rate may be 800 bits per second after the initial backup rate decreases by 20%. If CPU usage of the production server decreases by 10% to 20%, and memory usage of the production server decreases by 10% to 20%, the master backup server may increase a rate at which the first production server sends to-be-backed-up data to a corresponding backup execution server by 20%. Assuming that an initial backup rate is 1 megabit per second, the initial backup rate may be 1.2 megabits per second after the initial backup rate increases by 20%. It should be noted that herein, only an example is used for description. There is another threshold setting case. A setting manner is determined based on a situation. This is not limited in this solution.

In a possible implementation, if the second preset information includes a health status of each production server in the production system, when a production server in the production system is faulty, the master backup server may obtain, from another production server that normally runs, to-be-backed-up data that needs to be obtained from the production server, to continue backup. The master backup server may adjust a production execution server corresponding to a child backup task corresponding to the production server to another production server that normally runs, then generates information about an adjusted production server, and sends the information about the adjusted production server to a backup execution server corresponding to the child backup task. It should be noted that the adjusted production execution server has sufficient performance to replace the faulty production server to send the to-be-backed-up data to the backup server.

In a possible implementation, if the second preset information includes a health status of each backup server in the backup system, when a backup execution server in the backup system is faulty, the master backup server may allocate a child backup task for which the faulty backup execution server is responsible to another backup execution server that normally runs for continuous execution, to ensure that an entire backup process is successively completed on time. The master backup server may adjust a backup execution server corresponding to a child backup task corresponding to the backup execution server to another backup server that normally runs, then generates information about an adjusted backup server, and sends the information about the adjusted backup server and the child backup task to the backup execution server corresponding to the child backup task.

Step 405: The backup execution server receives the adjustment information.

Step 406: The backup execution server adjusts, based on the adjustment information, a request for obtaining to-be-backed-up data.

Step 407: The backup execution server sends an adjusted request for obtaining to-be-backed-up data to a production execution server corresponding to the target child backup task.

In an embodiment, after receiving the adjustment information for the child task sent by the master backup server, the corresponding backup execution server generates, based on the adjustment information, the adjusted request for obtaining to-be-backed-up data. If the adjustment information includes information about an adjusted range of to-be-backed-up data, the generated adjusted request for obtaining to-be-backed-up data carries the information about the adjusted range of the to-be-backed-up data. If the adjustment information includes information about an adjusted backup rate, the generated adjusted request for obtaining to-be-backed-up data carries the information about the adjusted backup rate. If the adjustment information includes information about an adjusted production server, the generated adjusted request for obtaining to-be-backed-up data carries address information of the adjusted production server, and the address information is used to indicate a production server to which the request is sent.

Step 408: The production execution server receives the adjusted request for obtaining to-be-backed-up data.

Step 409: The production execution server obtains the to-be-backed-up data based on the adjusted request for obtaining to-be-backed-up data.

Step 410: The production execution server sends the obtained to-be-backed-up data to the backup execution server.

In an embodiment, after receiving the adjusted request for obtaining to-be-backed-up data that is sent by the corresponding backup execution server, the corresponding production execution server obtains the to-be-backed-up data based on the request. If the request carries information about an adjusted range of to-be-backed-up data, the corresponding production execution server obtains the to-be-backed-up data based on the adjusted range of the to-be-backed-up data, and then sends the obtained to-be-backed-up data to the corresponding backup execution server. If the request carries information about an adjusted backup rate, the corresponding production execution server sends the obtained to-be-backed-up data to the corresponding backup execution server at the adjusted backup rate.

For ease of understanding of the solution, the following implementation is provided. The implementation is an optimal embodiment provided based on an idea of the method in FIG. 3 and/or FIG. 4.

Figure 1:
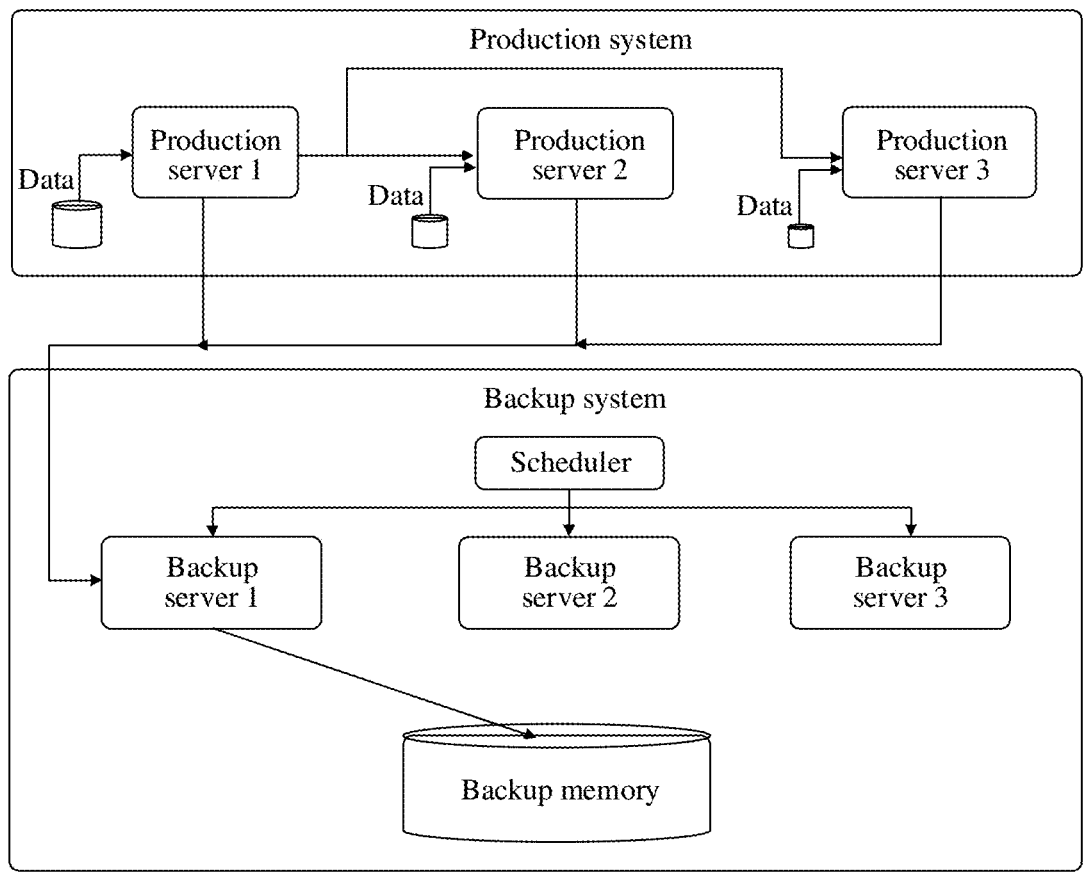
FIG. 1 is a schematic diagram of an architecture of a backup system in the conventional technology.
Figure 5:
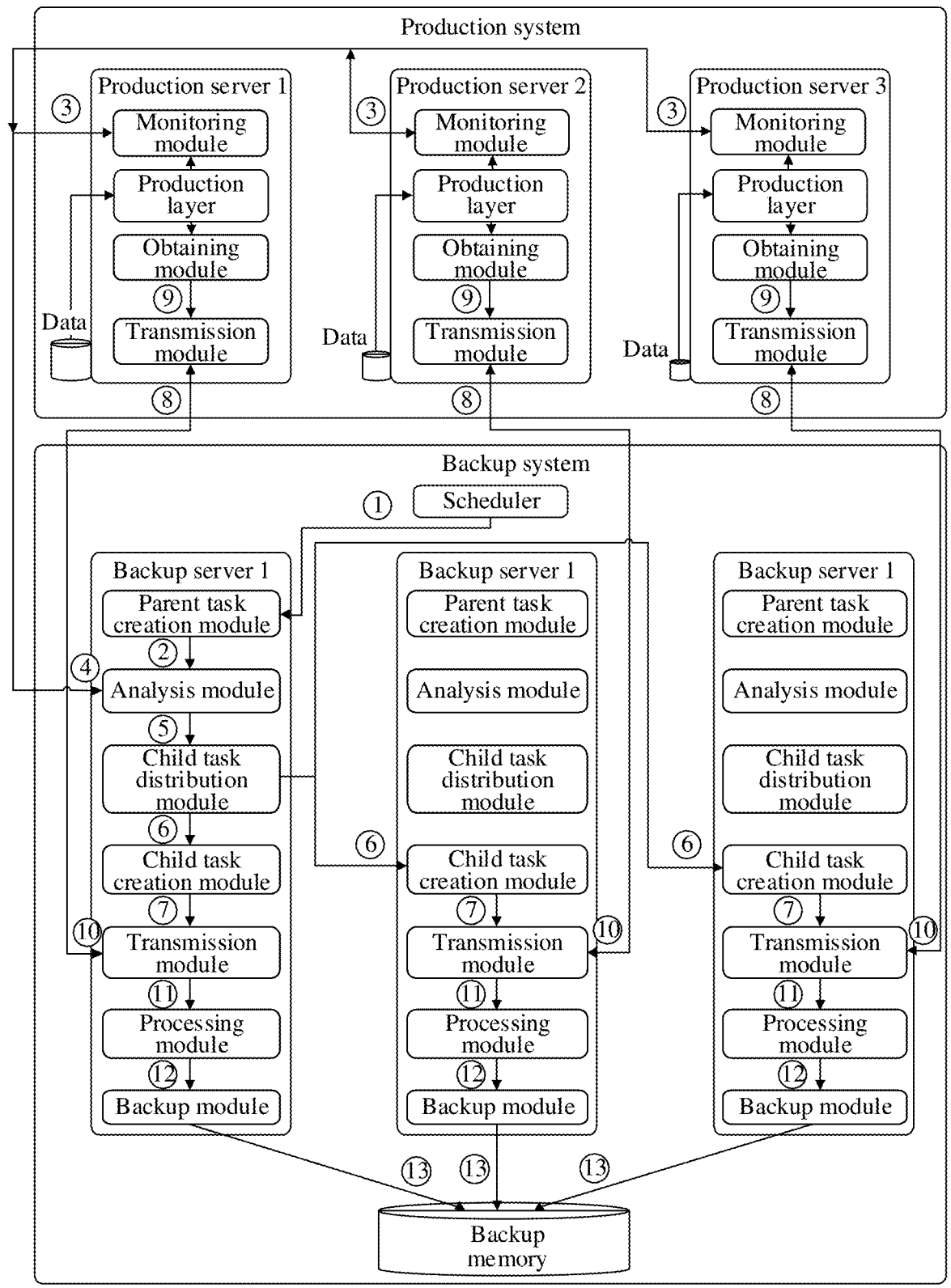
FIG. 5 is a schematic diagram of an architecture of a backup system according to an embodiment.

FIG. 5 is a schematic diagram of a framework of a system applicable to a backup processing method according to an embodiment. The schematic diagram of the framework of the system shown in FIG. 5 may be a schematic diagram of a framework of the system shown in FIG. 1.

As shown in FIG. 5, the system includes a production system and a backup system. The production system may include three production servers (a production server 1, a production server 2, and a production server 3). Each production server includes a monitoring module, a production layer, an obtaining module, and a transmission module. The backup system may include three backup servers (a backup server 1, a backup server 2, and a backup server 3), a scheduler, and a backup memory. Each backup server includes a parent task creation module, an analysis module, a child task distribution module, a child task creation module, a transmission module, a processing module, and a backup module.

In addition, in FIG. 5, the backup server 1 is a master backup server, and the backup server 2 and the backup server 3 are slave backup servers. It should be noted that the master backup server may be any one or more of a plurality of backup servers in the backup system and may be determined by the scheduler.

The following describes functions of the modules in the production server, the modules in the backup server, and the scheduler in a data backup process.

The monitoring module in the production server is configured to: monitor and obtain a data distribution status of the production server and a resource consumption status of the production server in real time and send the obtained status information to the master backup server.

The production layer in the production server is mainly configured to produce data, where to-be-backed-up data may be obtained from the production layer.

The obtaining module in the production server is configured to obtain to-be-backed-up data in the production server.

The transmission module in the production server is configured to transmit, to a corresponding backup server, the to-be-backed-up data obtained by the obtaining module.

The scheduler in the backup system is configured to schedule each backup server to back up data in the production system.

The parent task creation module in the backup server is configured to create a parent backup task, where the parent backup task is mainly used to complete two tasks. One task is to write, to a backup memory, a current backup object, that is, a name and an ID of the production system, a current backup timestamp, and a current backup type, for example, incremental backup or full backup. The other task is to analyze the data distribution status of the production server and the resource consumption status of the production server that are obtained from the production system, and then obtain child tasks through division and distribute the child tasks.

The analysis module in the backup server is configured to: receive and analyze the information sent by the monitoring module in the production server, and may determine, based on load and a data distribution status, distribution of the child tasks, a correspondence between each child task and a production server, a production data obtaining range of each child task, a range of responsibility for adjusting each child task in real time, a life cycle of the child task, and the like. The analysis module in the backup server may be further configured to analyze, in real time, the information sent by the monitoring module in the production server and generate adjustment information for a corresponding child task.

The child task distribution module in the backup server is configured to correspondingly distribute the child tasks obtained through division to the backup servers in the backup system and may further send the adjustment information for the child task to a corresponding backup server in real time.

The child task creation module in the backup server is configured to: create a child backup task according to a received child backup task creation instruction, and then send a request for obtaining to-be-backed-up data to a corresponding production server, and may be further configured to: receive real-time adjustment information for the child task, and adjust execution of the child task based on the adjustment information.

The transmission module in the backup server is configured to receive the to-be-backed-up data from the corresponding production server.

The processing module in the backup server is configured to process the to-be-backed-up data received by the transmission module, for example, perform an operation such as compression or deduplication on the data.

The backup module in the backup server is configured to store, in the backup memory, the data processed by the processing module.

The following describes, with reference to FIG. 5, an example of a procedure of a backup processing method provided in an embodiment. The method may include the following steps.

① The parent task creation module in the backup server 1 receives a backup instruction sent by the scheduler, where the backup instruction is used to indicate to deliver a backup task of data in the production system to the backup server 1, the backup server 1 may be used as a master backup server and other servers (the backup server 2 and the backup server 3) may be used as slave servers to assist the master backup server in backing up the data in the production system.

② After receiving the backup instruction, the parent task creation module generates a parent backup task according to the instruction, triggers the analysis module to obtain data distribution information and resource consumption information in the production system, and may further trigger the analysis module to obtain storage type information of data in the production system.

③ The analysis module sends an information obtaining instruction to each production server in the production system in response to the trigger of the parent task creation module, where the information obtaining instruction is used to trigger the monitoring module to obtain the data distribution information and the resource consumption information of the production server, and may further trigger the monitoring module to obtain the storage type information of the data in the production system.

④ After receiving the information obtaining instruction sent by the analysis module, each production server triggers the monitoring module to obtain data distribution information and resource consumption information of the production server and send the data distribution information and the resource consumption information to the analysis module, and may further trigger the monitoring module to obtain the storage type information of the data in the production system and send the data storage type information to the analysis module.

⑤ The analysis module may further obtain a plurality of child backup tasks through division based on the received data distribution information and resource consumption information of the production server, the received storage type information of the data in the production system, and a status of each backup server (for example, a quantity of backup servers and performance of each backup server). Each child backup task corresponds to information such as an identifier, information about a backup execution server, information about a production execution server, a range of data that the child backup task is responsible for backing up, and an initial performance indicator such as an initial backup rate.

⑥ After obtaining the plurality of child backup tasks through division, the analysis module triggers the child task distribution module to send child task creation instructions to backup execution servers (that is, the backup server 1, the backup server 2, and the backup server 3) corresponding to the child backup tasks, where the instruction may carry information included in a corresponding child backup task, such as an identifier, information about a backup execution server, information about a production execution server, a range of data that the child backup task is responsible for backing up, and an initial performance indicator such as an initial backup rate.

⑦ After receiving the child task creation instruction sent by the child task distribution module in the master backup server, each backup execution server triggers a child task creation module to create a child task and generate a request for obtaining to-be-backed-up data, where the request is used to request a corresponding production server to obtain the to-be-backed-up data, and the request may carry information about a data range of the to-be-backed-up data in the corresponding production server and information about an initial backup rate.

⑧ After generating the request for obtaining to-be-backed-up data, the child task creation module in the backup execution server triggers the transmission module in the backup execution server to send the request to a transmission module in a corresponding production execution server.

⑨ After receiving the request for obtaining to-be-backed-up data, the corresponding production execution server triggers an obtaining module in the production execution server to obtain the to-be-backed-up data from the production layer based on information about a data range of the to-be-backed-up data, and then transmits the obtained to-be-backed-up data to the transmission module.

⑩ The corresponding production execution server sends, by using the transmission module, the obtained to-be-backed-up data to the transmission module in the corresponding backup execution server at the initial backup rate carried in the request.

⑪ After receiving the to-be-backed-up data sent by the production execution server, the transmission module in the corresponding backup execution server transmits the data to the processing module, and the processing module performs a processing operation such as compression or deduplication on the data.

⑫ The processing module transmits a processed data to the backup module.

⑬ The backup module stores the received data in a backup memory.

In a possible implementation, in an entire backup process, the analysis module in the master backup server may obtain data distribution information and resource consumption information from each production server in the production system at an interval of first preset duration, and then the analysis module analyzes newly obtained information. If the newly obtained information changes compared with the previously obtained information, the analysis module may generate adjustment information for a corresponding child backup task based on these changes, the child task distribution modules send the adjustment information to the child task creation module in the corresponding backup execution server, then the child task creation module in the corresponding backup execution server generates, based on the adjustment information, an adjusted request for obtaining to-be-backed-up data, and the transmission module sends the request to the corresponding production execution server, so that the corresponding production server obtains the to-be-backed-up data based on the request and sends the to-be-backed-up data to the corresponding backup execution server for backup.

For descriptions and beneficial effects of the steps and the possible embodiments that are of the method described with reference to FIG. 5, correspondingly refer to the descriptions of the methods in FIG. 3 and FIG. 4. Details are not described herein again.

The following describes, in detail with reference to the accompanying drawings, a backup and restoration processing method provided in an embodiment.

Figure 6:
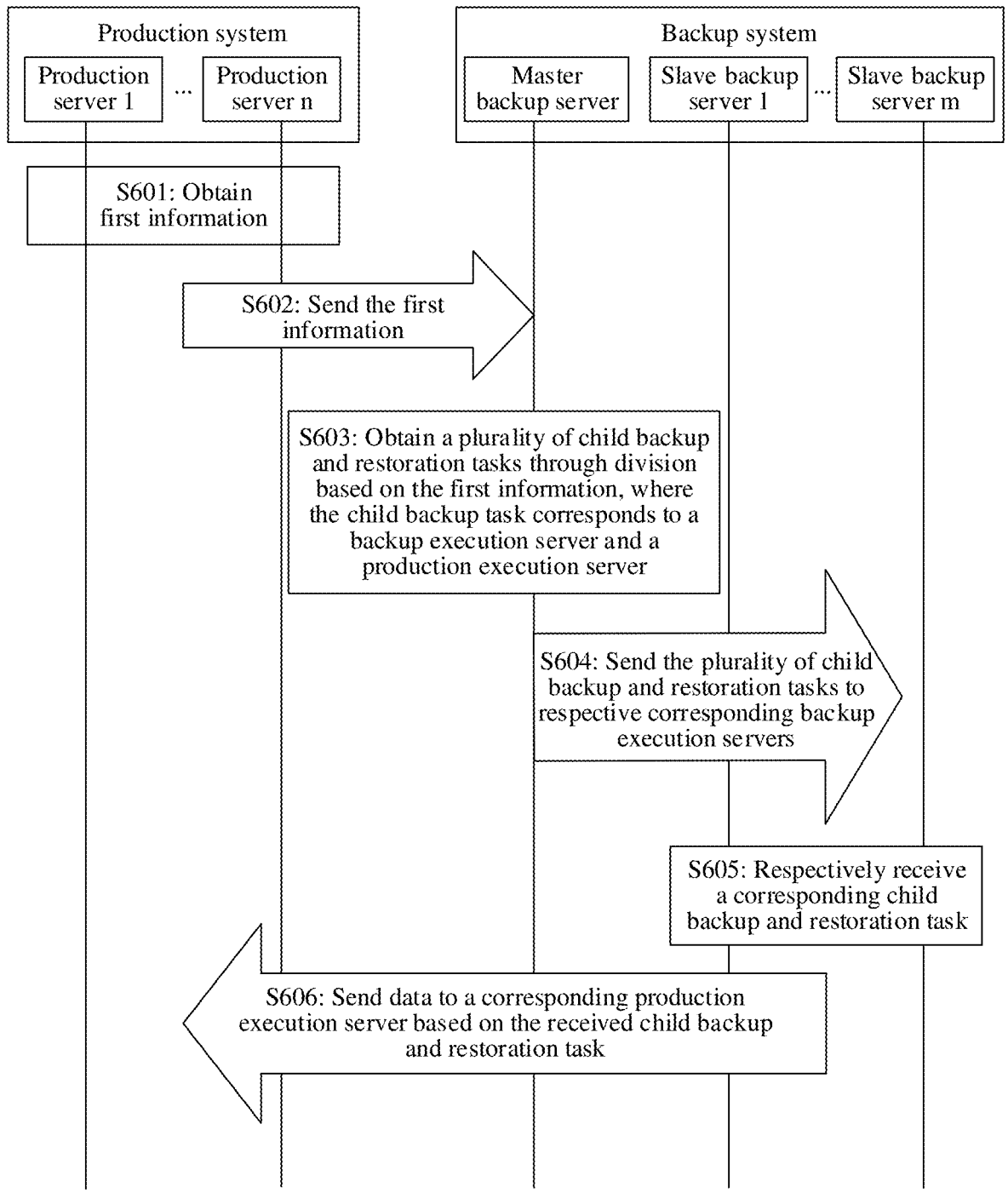
FIG. 6 is a schematic interaction flowchart of a backup and restoration processing method according to an embodiment.

FIG. 6 shows a backup and restoration processing method according to an embodiment. The method may be implemented based on the architecture of the system shown in FIG. 2. The method includes but is not limited to the following steps.

Step 601: A production server in a production system obtains first information.

Step 602: The production system sends the first information to a master backup server.

In an embodiment, the first information may include first resource consumption statuses respectively corresponding to a plurality of production servers in the production system. The first resource consumption status of the production server may be a resource consumption status of the production server at a moment at which the first resource consumption status is generated, and the resource consumption status may include processor (CPU) usage, memory usage, and external memory usage of the production server.

A manner of obtaining the first information herein may be the same as the manner of obtaining the first preset information in step 301. For details, refer to the corresponding descriptions. The details are not described herein again.

Step 603: The master backup server obtains a plurality of child backup and restoration tasks through division based on the first information, where the child backup and restoration task corresponds to a backup execution server and a production execution server.

Step 604: The master backup server sends the plurality of child backup and restoration tasks to respective corresponding backup execution servers.

The child backup and restoration task may correspond to the backup execution server and the production execution server and is used to indicate the backup execution server to send data in a preset range to the production execution server, to restore data in a backup system to the production system.

In an embodiment, the master backup server analyzes the obtained first information, and obtains the plurality of child backup and restoration tasks through division based on the analysis result. Each child backup and restoration task obtained through division may correspond to a child task identifier (ID), information about a backup server (that is, the backup execution server) that executes the child task, information about a production server (that is, the production execution server) that receives to-be-restored data sent based on the child task, and information about a range of the data that needs to be sent to the production execution server based on the child task (for example, information such as a capacity of the to-be-restored data and a corresponding file name). Optionally, each child backup and restoration task obtained through division may further correspond to information about an initial backup and restoration rate for the child task and the like. The initial backup and restoration rate may be used to indicate a backup execution server corresponding to the child task to send the to-be-restored data to a corresponding production execution server at the initial backup and restoration rate.

Optionally, the information about the production server may include one or more of a name, a media access control address, and an internet protocol address of the server. The information about the backup server may include one or more of a name, a media access control address, and an internet protocol address of the server.

In a possible implementation, there may be one backup execution server corresponding to each child backup and restoration task obtained through division. There may be one or more production execution servers corresponding to each child backup and restoration task obtained through division, that is, the child task may be responsible for sending, to only one production server, data that needs to be restored, or the child task may be responsible for respectively sending to-be-restored data to a plurality of production servers.

Step 605: Each of slave backup servers in the backup system receives a corresponding child backup and restoration task.

Step 606: The slave backup server in the backup system sends data to a corresponding production execution server based on the received child backup and restoration task.

In an embodiment, because each of the plurality of child backup and restoration tasks obtained by the master backup server through division corresponds to a backup execution server, the master backup server sends the plurality of child backup and restoration tasks to corresponding backup execution servers based on information about the backup execution server corresponding to each of the plurality of child backup and restoration tasks. The backup execution server herein may be a slave backup server.

After receiving the child backup and restoration task sent by the master backup server, the backup execution server may obtain, from a memory in the backup system based on the child backup and restoration task, the data that needs to be sent to the corresponding production execution server based on the child backup and restoration task, and then send the data to the corresponding production execution server.

Optionally, the child backup and restoration task received by the backup execution server may further include information about an initial backup and restoration rate. In this case, the backup execution server sends the to-be-restored data to the production execution server based on the initial backup and restoration rate.

Optionally, if one child backup and restoration task corresponds to a plurality of production execution servers, the one child backup and restoration task also correspondingly includes information about ranges of to-be-restored data that needs to be sent to the plurality of production execution servers, and/or correspondingly includes a plurality of initial backup and restoration rates at which to-be-restored data is sent to the plurality of production execution servers.

In a possible implementation, the master backup server may also be used as a backup execution server corresponding to a child backup and restoration task. The master backup server may distribute one or more child backup and restoration tasks to the master backup server for execution. After step 604 of sending the plurality of child backup and restoration tasks to the respective corresponding backup execution servers, the master backup server sends the to-be-restored data to the corresponding production execution server based on the one or more child backup and restoration tasks. For an implementation of sending the to-be-restored data to the production server in this embodiment, refer to the corresponding descriptions in step 605 and step 606. Details are not described herein again.

In a possible implementation, that the master backup server obtains a plurality of child backup and restoration tasks through division based on the first information includes: The master backup server determines load statuses of the plurality of production servers based on the first information. The master backup server determines, based on the load statuses of the plurality of production servers, ranges of data that needs to be respectively sent to the plurality of production servers. The master backup server obtains the child backup and restoration tasks through division based on the ranges of the data that needs to be respectively sent to the plurality of production servers.

In an embodiment, heavier load of the production server indicates less to-be-restored data sent by the backup server to the production server, and lighter load of the production server indicates more to-be-restored data sent by the backup server to the production server. The to-be-restored data that needs to be sent to each production server may be allocated based on a load status of each production server.

For ease of understanding of this embodiment, an example is used below for description. Table 7 shows an example of a resource consumption status of each production server in the production system.

TABLE 7

| Name of a production server | CPU usage | Memory usage | External memory usage |
|---|---|---|---|
| Production server 1 | 10% | 50% | 30% |
| Production server 2 | 35% | 40% | 45% |
| Production server 3 | 50% | 55% | 50% |
| Production server 4 | 75% | 65% | 60% |

It may be found by analyzing the information in Table 7 that the production server 1, the production server 2, the production server 3, and the production server 4 correspond to load in ascending order and used external memory space in ascending order. It is assumed that 100 G data needs to be restored to the production system, and file names corresponding to the 100 G data may be, for example, File_1, File_2, File_3, and File_4. Data amounts corresponding to the files File_1, File_2, File_3, and File_4 may be respectively, for example, 40 G, 30 G, 20 G, and 10 G. It is assumed that the backup system includes a backup server 1, a backup server 2, a backup server 3, a backup server 4, and the like. Based on the foregoing analysis, the master backup server may divide a backup and restoration task of data in the production system into four child backup and restoration tasks, where each child task corresponds to one production server.

It is assumed that task IDs of the four child tasks are respectively a child task 1, a child task 2, a child task 3, and a child task 4. Production execution servers corresponding to the child task 1, the child task 2, the child task 3, and the child task 4 may be respectively the production server 1, the production server 2, the production server 3, and the production server 4. Backup execution servers corresponding to the child task 1, the child task 2, the child task 3, and the child task 4 may be respectively the backup server 1, the backup server 2, the backup server 3, and the backup server 4. Because the production server 1, the production server 2, the production server 3, and the production server 4 correspond to load in ascending order and used external memory space in ascending order, when the master backup server obtains the child backup and restoration tasks through division, to-be-restored data that is allocated to the child task 1, the child task 2, the child task 3, and the child task 4 and that is respectively correspondingly sent to the production server 1, the production server 2, the production server 3, and the production server 4 corresponds to ranges in descending order, for example, may respectively correspond to "40 G and File_1", "30 G and File_2", "20 G and File_3", and "10 G and File_4". For information included in each child task obtained after the division, refer to Table 8.

TABLE 8

| Child task ID | Corresponding backup execution server | Corresponding production execution server | Range of to-be-restored data that needs to be sent |
|---|---|---|---|
| Child task 1 | Backup server 1 | Production server 1 | 40 G and File_1 |
| Child task 2 | Backup server 2 | Production server 2 | 30 G and File_2 |
| Child task 3 | Backup server 3 | Production server 3 | 20 G and File_3 |
| Child task 4 | Backup server 4 | Production server 4 | 10 G and File_4 |

Optionally, in the foregoing embodiment of obtaining the child backup and restoration tasks through division, the child backup and restoration tasks may be first obtained through division based on a load status of the production server, regardless of external memory usage of the production server. Lighter load of the production server indicates more data that needs to be sent to the production server based on the child backup and restoration task corresponding to the production server. If load statuses of two production servers are the same, external memory usage of the production servers is considered. When the load statuses of the two production servers are the same, less used external memory of the production server indicates more data that needs to be sent to the production server based on the child backup and restoration task corresponding to the production server. A range of to-be-sent data may be determined based on a situation. In the foregoing embodiments, an example in which one child backup and restoration task corresponds to one production execution server is used for description.

Optionally, in the foregoing embodiment of obtaining the child backup and restoration tasks through division, one child task may alternatively correspond to a plurality of production servers. For example, the master backup server may obtain three child backup and restoration tasks through division based on Table 7, where information included in each of the child task 1 and the child task 2 remains unchanged as shown in Table 8, a backup execution server corresponding to the child task 3 may be the backup server 3, and production execution servers corresponding to the child task 3 may be the production server 3 and the production server 4. In this case, ranges of to-be-restored data that needs to be sent based on the child task 3 include "20 G and File_3" and "10 G and File_4". Certainly, this is merely an example for description. Divisions may be determined based on a situation. This is not limited in this solution.

In a possible implementation, that the master backup server obtains a plurality of child backup and restoration tasks through division based on the first information includes: The master backup server determines, based on the first information, initial backup and restoration rates respectively corresponding to the plurality of production servers, where the initial backup and restoration rate is an initial rate at which the backup execution server sends data to the corresponding production execution server. The master backup server allocates the initial backup and restoration rates respectively corresponding to the plurality of production servers to the child backup and restoration tasks respectively corresponding to the plurality of production servers.

For ease of understanding of this embodiment, an example is used below for description.

Still refer to Table 7 and Table 8. In Table 7, the production server 1, the production server 2, the production server 3, and the production server 4 correspond to load in ascending order. Therefore, when initial backup and restoration rates for the corresponding Child task 1, the corresponding Child task 2, the corresponding Child task 3, and the corresponding Child task 4 in Table 8 are determined, the initial backup and restoration rates for the child task 1, the child task 2, the child task 3, and the child task 4 may be gradually slowed down in an order of the child task 1, the child task 2, the child task 3, and the child task 4.

For example, an initial backup and restoration rate for the child task 1 may be set to 1 megabit per second, an initial backup and restoration rate for the child task 2 may be set to 500 bits per second, an initial backup and restoration rate for the child task 3 may be set to 200 bits per second, and an initial backup and restoration rate for the child task 4 may be set to 100 bits per second.

Alternatively, an initial backup and restoration rate for each child backup and restoration task may be determined by setting a threshold. For example, if CPU usage of the production server is less than or equal to 20%, an initial rate for a child backup and restoration task corresponding to the production server may be set to 1 megabit per second. If CPU usage of the production server is greater than 20% and less than or equal to 40%, an initial rate for a child backup and restoration task corresponding to the production server may be set to 500 bits per second. If CPU usage of the production server is greater than 40% and less than 60%, an initial rate for a child backup and restoration task corresponding to the production server may be set to 200 bits per second. If CPU usage of the production server is greater than 60%, an initial rate for a child backup and restoration task corresponding to the production server may be set to 100 bits per second. Herein, only an example is used to describe a manner of determining a backup and restoration rate. There is another embodiment of determining the backup and restoration rate. For example, a corresponding backup and restoration rate is determined based on memory usage of a production server. A determining manner is determined based on a situation. This is not limited in this solution.

It should be noted that the example of setting the initial backup and restoration rate described above is described when one child backup and restoration task corresponds to one production server. If one child backup and restoration task corresponds to a plurality of production servers, respective initial backup and restoration rates may be set based on respective resource consumption statuses of the plurality of production servers. The child backup and restoration task may correspond to a plurality of initial backup and restoration rates.

In a possible implementation, after the master backup server receives the first information, before an entire backup and restoration process is completed, the master backup server obtains latest information at an interval of second preset duration, where the latest information may include latest resource consumption information in the production system, and may further include a latest health status of each production server in the production system and/or a latest health status of each backup server in the backup system. Then, the master backup server analyzes the information to generate adjustment information for a corresponding child backup and restoration task, where the adjustment information is used to adjust some parameters in a backup and restoration process, to ensure that a production service of the production server and a backup and restoration operation of the backup server can be performed at the same time without affecting production of the production server.

In an embodiment, because production in the production system is always being performed, a resource consumption status continuously changes. Therefore, in an entire backup and restoration process, the master backup server may obtain a latest resource consumption status from the production system at an interval of second preset duration, to adjust some parameters in the backup and restoration process, so as to implement both backup and production. The preset duration may be 5 minutes, 10 minutes, half an hour, or the like. The preset duration may be determined based on a situation. This is not limited in this solution. The second preset duration may be the same as or different from the first preset duration.

Optionally, the information obtained by the master backup server at an interval of second preset duration may be obtained through direct interaction with the production system, or may be sent by another device to the master backup server after the another device first obtains the information from the production system.

Figure 7:
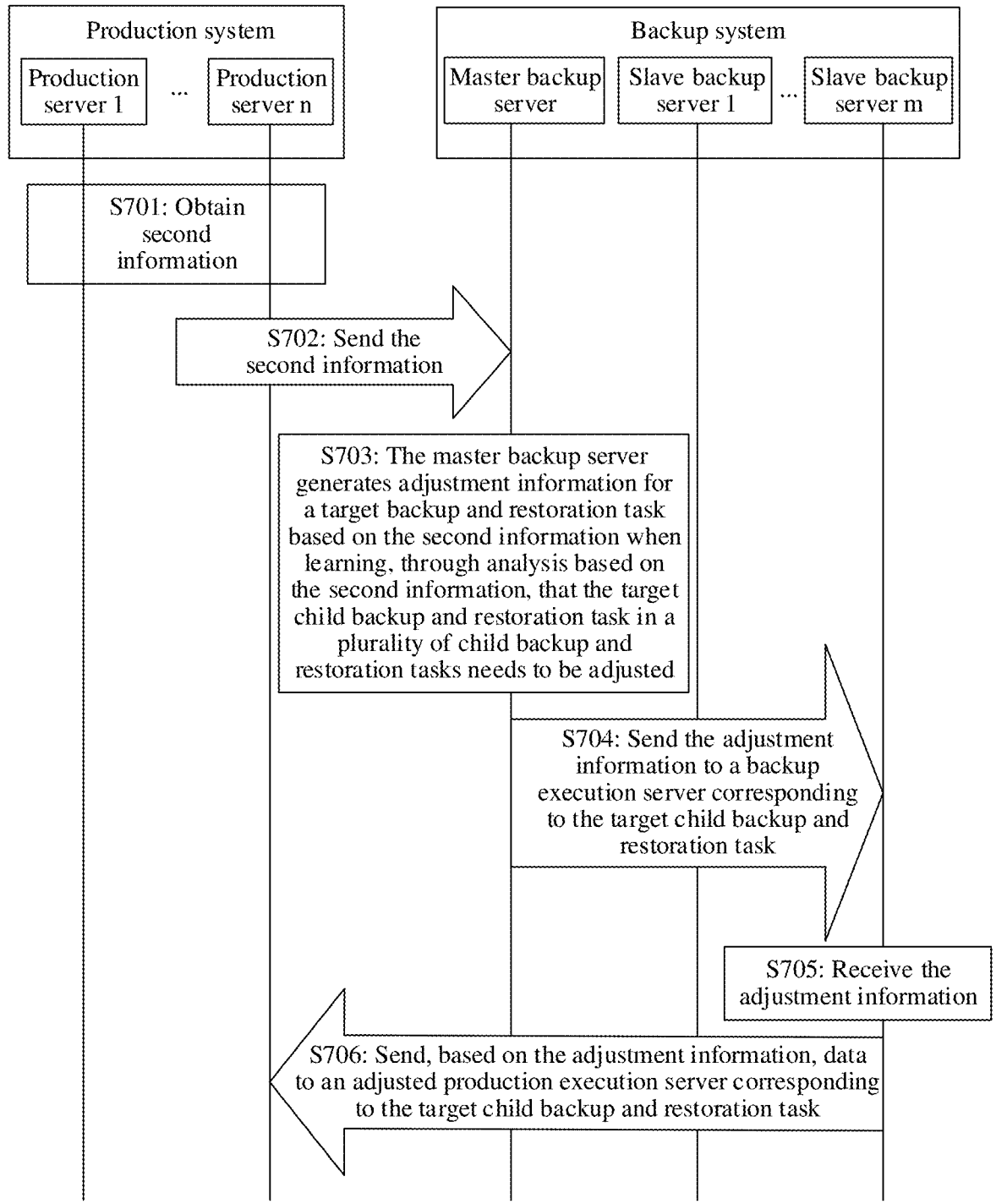
FIG. 7 is a schematic interaction flowchart of a backup and restoration processing method according to an embodiment.

The following describes, with reference to FIG. 7, an example in which the master backup server obtains second information at an interval of the second preset duration after obtaining the first information, how to generate adjustment information for a corresponding child backup and restoration task based on the information. The second information includes one or more of second resource consumption information and health status information of a server.

The second resource consumption information may include latest resource consumption information in the production system, and the information may be a resource consumption status corresponding to each production server in the production system at a moment at which the second resource consumption information is generated. The health status information of the server may include a latest health status of each production server in the production system and/or a latest health status of each backup server in the backup system, and the status may be a health status of each production server in the production system and/or a health status of each backup server in the backup system at a moment at which the health status information of the server is obtained.

It should be noted that a manner of processing information such as the latest resource consumption status that is in the production system and that is obtained at an interval of the second preset duration after the second information is obtained may be the same as this manner.

In FIG. 7, the method may include but is not limited to the following steps.

Step 701: The production system obtains second information.

Step 702: The production system sends the second information to a master backup server.

In an embodiment, a manner in which the production system obtains the second information may be the same as a manner in which the production system obtains the first information. When the second information includes a health status of each production server in the production system and/or a health status of each backup server in the backup system, each production server in the production system may obtain a health status of each production server and send the health status to the master backup server, or a server or a device (for example, a server dedicated to monitoring a health status of each production server in the production system) collects health status information in the production system, and then a server in the production system centrally sends the health status information to the master backup server. In addition, the master backup server may actively collect a health status of each backup server in the backup system. For example, the master backup server may send a health status obtaining request to a backup server, and after receiving the request, the backup server obtains health status information of the backup server and sends the health status information to the master backup server. Alternatively, if the backup system includes a server dedicated to monitoring a health status of each backup server, the master backup server may obtain the health status of each backup server from the server.

Step 703: The master backup server generates adjustment information for a target child backup and restoration task based on the second information when the master backup server learns, through analysis based on the second information, that the target child backup and restoration task in a plurality of child backup and restoration tasks needs to be adjusted.

Step 704: The master backup server sends the adjustment information to a backup execution server corresponding to the target child backup and restoration task.

In a possible implementation, the obtained second information includes the second resource consumption information, that is, includes processor CPU usage, memory usage, external memory usage, and the like that correspond to each production server in the production system when the second resource consumption information is obtained. In this case, the master backup server may compare the information with the first information. The master backup server may correspondingly compare, by using a production server as an object, information about each production server that is included in the second resource consumption information with information about each production server that is included in the first information, that is, compares data obtained by a same production server at different moments, for example, compares information about a first production server that is included in the second resource consumption information with information about the first production server that is included in the first information, and compares information about a second production server that is included in the second resource consumption information with information about the second production server that is included in the first information.

If it is found, after the comparison, that a resource consumption status (one or more of CPU usage, memory usage, and external memory usage) of a production server changes, the master backup server may generate, based on a change status, adjustment information for a child backup and restoration task corresponding to the production server, and send the generated adjustment information to a corresponding backup execution server.

Optionally, the master backup server may determine, through analysis by comparing the second resource consumption information with the first information, whether to adjust a range of data that needs to be sent to a corresponding production execution server based on the child backup and restoration task. For example, in the first information, CPU usage of the first production server is 10%, but in the second resource consumption information, CPU usage of the first production server is 50%. After the first information is obtained, before the second resource consumption information is obtained, the CPU usage of the first production server increases by 50%. In other words, production load of the first production server increases in this period of time. In this case, to avoid affecting a production service of the first production server, that is, to avoid preempting a resource with the production service, the master backup server may decrease a range of to-be-restored data to be sent to the first production server, then generate an adjusted range that is of the data to be sent to the first production server and that corresponds to a child backup and restoration task corresponding to the first production server, and send information about the adjusted range of the data to the corresponding backup execution server. Herein, only an example is used for description. There is another possible embodiment. The adjusted range of the data may be determined based on a situation. This is not limited in this solution.

In addition, if it is found, after the comparison, that load of the first production server is lightened, to fully utilize resources of the production server and improve utilization, the master backup server may increase a range of to-be-restored data to be sent to the first production server, then generate an adjusted range that is of the data to be sent to the first production server and that corresponds to a child backup and restoration task corresponding to the first production server, and send information about the adjusted range of the data to the corresponding backup execution server.

It should be noted that the adjusted range of the data may also be determined based on memory usage of the server. More used memory indicates heavier load, and in this case, a smaller range of to-be-restored data received by the corresponding production server may be set, and less used memory indicates lighter load, and in this case, a larger range of to-be-restored data received by the corresponding production server may be set.

The adjusted range may ensure that an amount of the to-be-restored data received by the production server is not greater than remaining external memory space of the production server.

Optionally, the master backup server may determine, through analysis by comparing the second resource consumption information with the first information, whether to adjust a backup and restoration rate for the child backup and restoration task. For example, in the first information, CPU usage of the first production server is 10%, but in the second resource consumption information, CPU usage of the first production server is 50%. After the first information is obtained, before the second resource consumption information is obtained, the CPU usage of the first production server increases by 50%. In other words, production load of the first production server increases in this period of time. In this case, to avoid affecting a production service of the first production server, that is, to avoid preempting a resource with the production service, the master backup server may decrease a rate at which the first production server receives to-be-restored data sent by a corresponding backup execution server, that is, decrease a rate at which the corresponding backup execution server sends the to-be-restored data to the first production server, then generate an adjusted backup and restoration rate for a child backup and restoration task corresponding to the first production server, and send the adjusted backup and restoration rate to the corresponding backup execution server. Herein, only an example is used for description. There is another possible embodiment. The adjusted backup and restoration rate may be determined based on a situation. This is not limited in this solution.

In addition, if it is found, after the comparison, that load of the first production server is reduced, to fully use resources of the production server and improve utilization, the master backup server may increase a rate at which the first production server receives to-be-restored data sent by a corresponding backup execution server, that is, increase a rate at which the corresponding backup execution server sends the to-be-restored data to the first production server, then generate an adjusted backup and restoration rate for a child backup and restoration task corresponding to the first production server, and send the adjusted backup and restoration rate to the corresponding backup execution server.

Optionally, an adjusted backup and restoration rate may be determined by setting a threshold. For example, after the master backup server compares the two obtained resource consumption statuses, if CPU usage of the production server increases by 10% to 20%, the master backup server may decrease a rate at which the first production server sends to-be-backed-up data to a corresponding backup execution server by 20%. Assuming that an initial backup and restoration rate is 1 megabit per second, the initial backup and restoration rate may be 800 bits per second after the initial backup and restoration rate decreases by 20%. If CPU usage of the production server decreases by 10% to 20%, the master backup server may increase a rate at which the first production server sends to-be-backed-up data to a corresponding backup execution server by 20%. Assuming that an initial backup and restoration rate is 1 megabit per second, the initial backup and restoration rate may be 1.2 megabits per second after the initial backup and restoration rate increases by 20%. It should be noted that herein, only an example is used for description. There is another threshold setting case. A setting manner is determined based on a situation. This is not limited in this solution.

It should be noted that the adjusted and determined backup and restoration rate may also be determined based on memory usage of the server. More used memory indicates heavier load, and in this case, a lower backup and restoration rate of the corresponding production server may be set, and less used memory indicates lighter load, and in this case, a higher backup and restoration rate of the corresponding production server may be set.

In a possible implementation, if the second information includes a health status of each production server in the production system, when a production server in the production system is faulty, the master backup server may send, to another production server that normally runs, to-be-restored data sent to the production server, to ensure that an entire data restoration process is completed. The master backup server may adjust a production execution server corresponding to a child backup and restoration task corresponding to the production server to another production server that normally runs, then generates information about an adjusted production server, and sends the information about the adjusted production server to a backup execution server corresponding to the child backup and restoration task. It should be noted that the adjusted production execution server has sufficient performance and storage space to receive the to-be-restored data in the faulty production server.

In a possible implementation, if the second information includes a health status of each backup server in the backup system, when a backup execution server in the backup system is faulty, the master backup server may allocate a child backup and restoration task for which the faulty backup execution server is responsible to another backup execution server that normally runs for continuous execution, to ensure that an entire backup process is successively completed on time. The master backup server may adjust a backup execution server corresponding to a child backup and restoration task corresponding to the backup execution server to another backup server that normally runs, then generates information about an adjusted backup server, and sends the information about the adjusted backup server and the child backup and restoration task to the backup execution server corresponding to the child backup and restoration task.

Step 705: The corresponding backup execution server receives the adjustment information.

Step 706: The corresponding backup execution server sends, based on the adjustment information, data to the adjusted production execution server corresponding to the target child backup and restoration task.

In an embodiment, after receiving the adjustment information, the corresponding backup execution server analyzes the adjustment information. If the adjustment information includes information about an adjusted range of to-be-restored data sent to the corresponding production execution server, the backup server sends the data to the corresponding production execution server based on the information about the range. If the adjustment information includes information about an adjusted backup and restoration rate, the backup server sends data to the corresponding production execution server at the backup and restoration rate. If the adjustment information includes information about an adjusted corresponding production execution server, the backup server sends data to the adjusted production execution server based on the information.

For ease of understanding of the solution, the following implementation is provided. The implementation is an optimal embodiment provided based on an idea of the method in FIG. 6 and/or FIG. 7.

Figure 8:
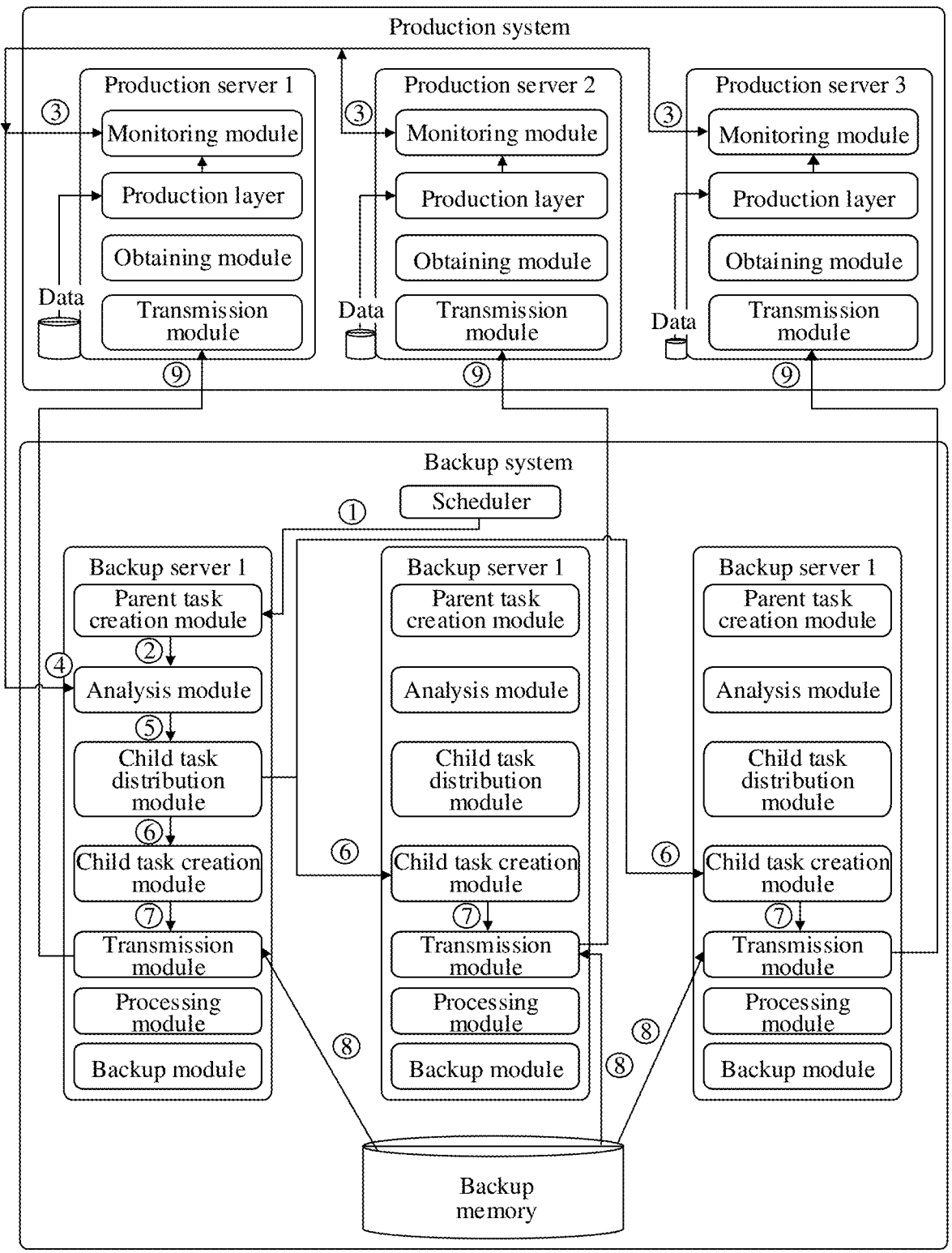
FIG. 8 is a schematic diagram of an architecture of a backup and restoration system according to an embodiment.

FIG. 8 is a schematic diagram of a framework of a system library applicable to a backup processing method according to an embodiment. The schematic diagram of the framework of the system shown in FIG. 8 may be a schematic diagram of a framework of the framework of the system shown in FIG. 1. The framework of the system shown in FIG. 8 may be the same as the framework of the system shown in FIG. 5. A procedure shown in FIG. 5 is a process of completing data backup based on the framework, and a procedure shown in FIG. 8 is a process of completing backup and restoration based on the framework.

As shown in FIG. 8, the system includes a production system and a backup system. The production system may include three production servers (a production server 1, a production server 2, and a production server 3). Each production server includes a monitoring module, a production layer, an obtaining module, and a transmission module. The backup system may include three backup servers (a backup server 1, a backup server 2, and a backup server 3), a scheduler, and a backup memory. Each backup server includes a parent task creation module, an analysis module, a child task distribution module, a child task creation module, a transmission module, a processing module, and a backup module.

In addition, in FIG. 8, the backup server 1 is a master backup server, and the backup server 2 and the backup server 3 are slave backup servers. It should be noted that the master backup server may be any one or more of a plurality of backup servers in the backup system and may be determined by the scheduler.

The following describes functions of the modules in the production server, the modules in the backup server, and the scheduler in a data backup and restoration process.

The monitoring module in the production server is configured to monitor and obtain a resource consumption status of the production server in real time and send the obtained status information to the master backup server.

The production layer in the production server is mainly configured to produce data.

The transmission module in the production server is configured to receive to-be-restored data sent by the backup server.

The scheduler in the backup system is configured to schedule each backup server to perform backup and restoration on data in the production system.

The parent task creation module in the backup server is configured to create a parent backup task, where the parent backup task is mainly used to complete two tasks. One task is to write, to a backup memory, a current backup and restoration object, that is, a name and an ID of the production system, and a current backup and restoration timestamp. The other task is to analyze the resource consumption status that is of the production server and that is obtained from the production system, and then obtain child tasks through division and distribute the child tasks.

The analysis module in the backup server is configured to: receive and analyze the information sent by the monitoring module in the production server, and may determine, based on load and external memory usage of the production server, distribution of the child tasks, a correspondence between each child task and a production server, a range of data that each child task is responsible for sending, a range of responsibility for adjusting each child task in real time, a life cycle of the child task, and the like. The analysis module in the backup server may be further configured to analyze, in real time, the information sent by the monitoring module in the production server and generate adjustment information for a corresponding child task.

The child task distribution module in the backup server is configured to correspondingly distribute the child tasks obtained through division to the backup servers in the backup system and may further send the adjustment information for the child task to a corresponding backup server in real time.

The child task creation module in the backup server is configured to create a child backup and restoration task according to a received child backup and restoration task creation instruction, and then send to-be-restored data to a corresponding production server and may be further configured to receive real-time adjustment information for the child task and adjust execution of the child task based on the adjustment information.

The transmission module in the backup server is configured to: obtain the to-be-restored data from the backup memory and transmit the to-be-restored data to the transmission module in corresponding production server.

A module other than the foregoing modules whose functions are described may be temporarily not used in a data backup and restoration process.

The following describes, with reference to FIG. 8, an example of a procedure of a backup and restoration processing method provided in an embodiment. The method may include the following steps.

① The parent task creation module in the backup server 1 receives a backup and restoration instruction sent by the scheduler, where the backup and restoration instruction is used to indicate to deliver a backup and restoration task of data in the production system to the backup server 1. The backup server 1 may be used as a master backup server and other servers (the backup server 2 and the backup server 3) may be used as slave servers to assist the master backup server in completing backup and restoration on the data in the production system.

② After receiving the backup and restoration instruction, the parent task creation module generates a parent backup and restoration task according to the instruction, triggers the analysis module to obtain resource consumption information in the production system, and may further trigger the analysis module to obtain storage type information of data in the production system.

③ The analysis module sends an information obtaining instruction to each production server in the production system in response to the trigger of the parent task creation module, where the information obtaining instruction is used to trigger the monitoring module to obtain the resource consumption information of the production server and may further trigger the monitoring module to obtain the storage type information of the data in the production system.

④ After receiving the information obtaining instruction sent by the analysis module, each production server triggers the monitoring module to obtain resource consumption information of the production server and send the resource consumption information to the analysis module and may further trigger the monitoring module to obtain the storage type information of the data in the production system and send the storage type information of the data to the analysis module.

⑤ The analysis module may further obtain a plurality of child backup and restoration tasks through division based on the received resource consumption information of the production server, the received storage type information of the data in the production system, and a status of each backup server (for example, a quantity of backup servers and performance of each backup server). Each child backup and restoration task corresponds to information such as an identifier, information about a backup execution server, information about a production execution server, a range of data that the child backup and restoration task is responsible for backing up, and an initial performance indicator such as an initial backup and restoration rate.

⑥ After obtaining the plurality of child backup and restoration tasks through division, the analysis module triggers the child task distribution module to send child task creation instructions to backup execution servers (that is, the backup server 1, the backup server 2, and the backup server 3) corresponding to the child backup and restoration tasks, where the instruction may carry information included in a corresponding child backup and restoration task, such as an identifier, information about a backup execution server, information about a production execution server, a range of data that the child backup and restoration task is responsible for backing up and restoring, and an initial performance indicator such as an initial backup and restoration rate.

⑦ After receiving the child task creation instruction sent by the child task distribution module in the master backup server, each backup execution server triggers the child task creation module in each backup execution server to create a child task, and then triggers the transmission module in each backup execution server to obtain to-be-restored data from the backup memory based on the child task created by the backup execution server.

⑧ The transmission module in each backup execution server obtains the to-be-restored data from the backup memory based on the child task created by the backup execution server.

⑨ The transmission module in each backup execution server sends the obtained data to the transmission module in the corresponding production execution server.

Then, if a storage type of the data in the production system is a dispersed type, the transmission module in each production server stores the corresponding received data in a corresponding memory. If a storage type of the data in the production system is a shared type, the transmission module in each production server stores the corresponding received data in a shared memory.

In a possible implementation, in an entire backup and restoration process, the analysis module in the master backup server may obtain resource consumption information from each production server in the production system at an interval of second preset duration, and then the analysis module analyzes newly obtained information. If the newly obtained information changes compared with the previously obtained information, the analysis module may generate adjustment information for a corresponding child backup and restoration task based on these changes, the child task distribution module sends the adjustment information to the child task creation module in the corresponding backup execution server, and then the child task creation module in the corresponding backup execution server sends the to-be-restored data to the corresponding production execution server based on the adjustment information by using the transmission module, so that the corresponding production server restores backup data.

For descriptions and beneficial effects of the steps and the possible embodiments that are of the method described with reference to FIG. 8, correspondingly refer to the descriptions of the methods in FIG. 6 and FIG. 7. Details are not described herein again.

The foregoing mainly describes, from perspectives of interaction between the master backup server and the slave backup server, interaction between the master backup server and the production server, and interaction between the slave backup server and the production server, the solutions provided in the embodiments. It may be understood that, to implement the foregoing functions, servers, such as a master backup server, a slave backup server, and a production server, each include a corresponding hardware structure and/or software module for performing each function. A person skilled in the art should be easily aware that servers, methods, and steps in the examples described with reference to the embodiments can be implemented in a form of hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

In the embodiments, the master backup server, the slave backup server, the production server, and the like each may be divided into functional modules based on the method examples. For example, each functional module may be obtained through division based on each corresponding function, or two or more functions may be integrated into one processing module. The integrated module may be implemented in a form of hardware or may be implemented in a form of a software functional module. It should be noted that in the embodiments, division into the modules is an example and may be either logical function division or another implementation of division.

Figure 9:
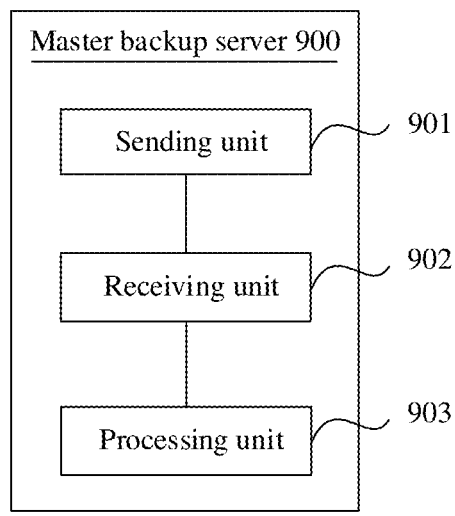
FIG. 9 is a schematic diagram of a logical structure of a master backup server according to an embodiment.

When each functional module is obtained through division based on each corresponding function, FIG. 9 is a possible schematic diagram of a logical structure of a master backup server related to the foregoing embodiment. The master backup server 900 includes a sending unit 901, a receiving unit 902, and a processing unit 903. For example, the sending unit 901 is configured to support the master backup server in performing the step of sending information by the master backup server in the method embodiment shown in FIG. 3, FIG. 4, or FIG. 5 and the possible implementations thereof. The receiving unit 902 is configured to support the master backup server in performing the step of receiving or obtaining information by the master backup server in the method embodiment shown in FIG. 3, FIG. 4, or FIG. 5 and the possible implementations thereof. The processing unit 903 is configured to support the master backup server in performing the step of obtaining a child backup task through division, generating information, or adjusting information by the master backup server in the method embodiment shown in FIG. 3, FIG. 4, or FIG. 5 and the possible implementations thereof, a step other than the steps performed by the sending unit 901 and the receiving unit 902, and the like.

Optionally, the master backup server 900 may further include a storage unit, configured to store a computer program or data. In a possible manner, the processing unit 903 may invoke the computer program or the data in the storage unit, so that the master backup server 900 obtains first preset information, where the first preset information includes one or more of first data distribution information and first resource consumption information, the first data distribution information includes a first distribution status of to-be-backed-up data in a production system, the production system includes a plurality of production servers, and the first resource consumption information includes first resource consumption statuses respectively corresponding to the plurality of production servers. Then, the master backup server 900 obtains a plurality of child backup tasks through division based on the first preset information, where the child backup task corresponds to a backup execution server and a production execution server and is used to indicate the backup execution server to back up to-be-backed-up data in a target range in the production execution server, the backup execution server includes a backup server in a backup system, and the production execution server includes one or more production servers in the production system; and sends the plurality of child backup tasks to respective corresponding backup execution servers.

Optionally, the master backup server 900 may further include a storage unit, configured to store a computer program or data. In a possible manner, the processing unit 903 may invoke the computer program or the data in the storage unit, so that the master backup server 900 obtains first information, where the first information includes third resource consumption statuses respectively corresponding to a plurality of production servers in a production system; obtains a plurality of child backup and restoration tasks through division based on the first information, where the child backup and restoration task corresponds to a backup execution server and a production execution server and is used to indicate the backup execution server to send data in a target range to the production execution server, the backup execution server includes a backup server in a backup system, and the production execution server includes one or more production servers in the production system; and then sends the plurality of child backup and restoration tasks to respective corresponding backup execution servers.

In hardware implementation, the processing unit 903 may be a processor, a processing circuit, or the like. The sending unit 901 and the receiving unit 902 may be coupled as a transceiver, a transceiver circuit, an interface circuit, or the like. The storage unit may be a memory. The processing unit, the sending unit, the receiving unit, and the storage unit may be integrated or separated.

Figure 10:
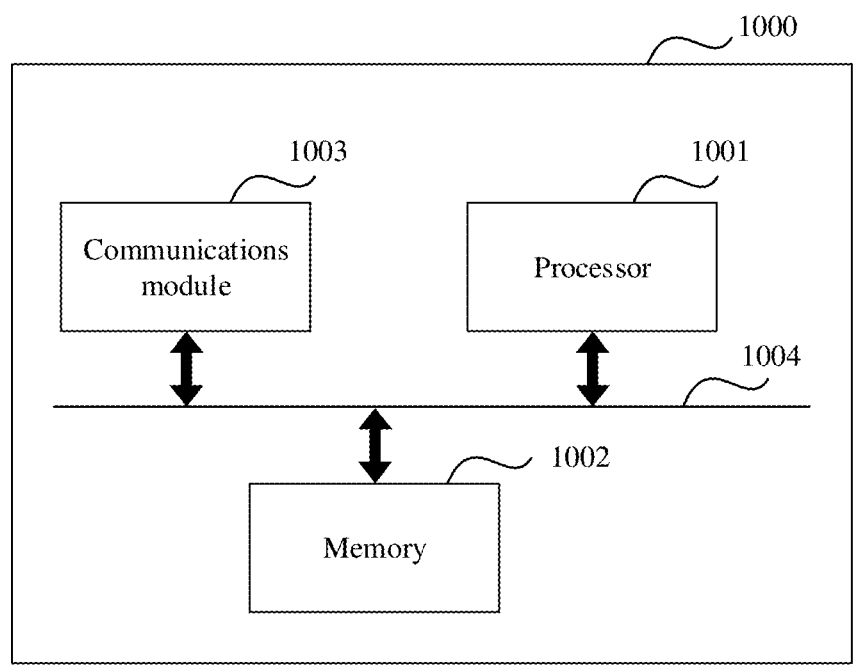
FIG. 10 is a schematic diagram of a hardware structure of a master backup server according to an embodiment.

FIG. 10 is a possible schematic diagram of a hardware structure of a master backup server related to the foregoing embodiment according to an embodiment. As shown in FIG. 10, the master backup server 1000 may include one or more processors 1001, one or more memories 1002, and a communications module 1003 (for example, may be one or more transceivers). These components may be connected through a bus 1004 or in another manner. In FIG. 10, an example in which the components are connected through a bus is used.

The communications module 1003 may be configured to send information or a request generated by the processor 1001, for example, a generated child backup task or a generated request for obtaining to-be-backed-up data. The communications module 1003 may be further configured to receive data, for example, data distribution information or to-be-backed-up data in a production system.

The memory 1002 may be coupled to the processor 1001 through the bus 1004 or an input/output port, or the memory 1002 may be integrated with the processor 1001. The memory 1002 is configured to store various software programs and/or a plurality of groups of instructions or data. The memory 1002 may include a high-speed random access memory, and may further include a nonvolatile memory, for example, one or more magnetic disk storage devices, a flash memory device, or another nonvolatile solid-state storage device. The memory 1002 may store an operating system (which is briefly referred to as a system below), for example, an embedded operating system such as uCOS, VxWorks, or RTLinux.

The processor 1001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to disclosed content. Alternatively, the processor may be a combination of processors implementing a determining function, for example, a combination of one or more microprocessors or a combination of a digital signal processor and a microprocessor.

In this embodiment, the processor 1001 may be configured to read and execute computer readable instructions. The processor 1001 may be configured to: invoke a program stored in the memory 1002, for example, a program for implementing, on a side of the master backup server 1000, the backup processing method provided in one or more embodiments, and execute instructions included in the program.

It should be noted that the master backup server 1000 shown in FIG. 10 is merely an implementation of this embodiment. The master backup server 1000 may further include more or fewer components. This is not limited herein. For implementation of the master backup server 1000, refer to the related descriptions in the method embodiment shown in FIG. 3, FIG. 4, or FIG. 5 and the possible implementations thereof. Details are not described herein again. Alternatively, for implementation of the master backup server 1000, refer to the related descriptions in the method embodiment shown in FIG. 6, FIG. 7, or FIG. 8 and the possible implementations thereof. Details are not described herein again.

Figure 11:
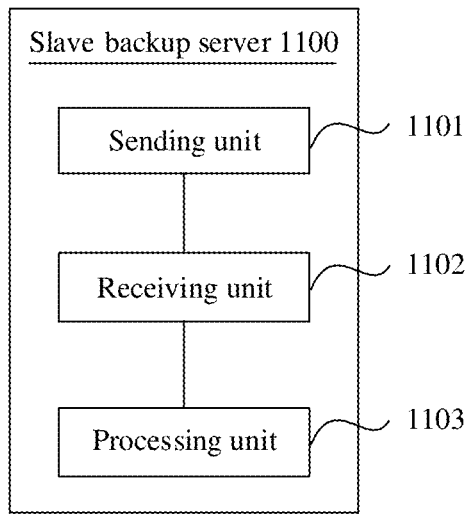
FIG. 11 is a schematic diagram of a logical structure of a slave backup server according to an embodiment.

When each functional module is obtained through division based on each corresponding function, FIG. 11 is a possible schematic diagram of a logical structure of a slave backup server related to the foregoing embodiment. The slave backup server 1100 includes a sending unit 1101, a receiving unit 1102, and a processing unit 1103. For example, the sending unit 1101 is configured to support the slave backup server in performing the step of sending information by the slave backup server in the method embodiment shown in FIG. 3, FIG. 4, or FIG. 5 and the possible implementations thereof. The receiving unit 1102 is configured to support the slave backup server in performing the step of receiving information by the slave backup server in the method embodiment shown in FIG. 3, FIG. 4, or FIG. 5 and the possible implementations thereof. The processing unit 1103 is configured to support the slave backup server in performing the step of adjusting information by the slave backup server in the method embodiment shown in FIG. 3, FIG. 4, or FIG. 5 and the possible implementations thereof, a step other than the steps performed by the sending unit 1101 and the receiving unit 1102, and the like.

Optionally, the slave backup server 1100 may further include a storage unit, configured to store a computer program or data. In a possible manner, the processing unit 1103 may invoke the computer program or the data in the storage unit, so that the slave backup server 1100 receives a child backup task sent by a master backup server, where the child backup task corresponds to a production execution server and is used to indicate a first backup server to back up to-be-backed-up data in a target range in the production execution server, and the production execution server is a server in a production system; sends, based on the child backup task, a request for obtaining to-be-backed-up data to the production execution server, where the request for obtaining to-be-backed-up data includes information about a range of the to-be-backed-up data; and then receives the to-be-backed-up data sent by the production execution server.

Optionally, the slave backup server 1100 may further include a storage unit, configured to store a computer program or data. In a possible manner, the processing unit 1103 may invoke the computer program or the data in the storage unit, so that the slave backup server 1100 receives a child backup and restoration task sent by a master backup server, where the child backup and restoration task corresponds to a production execution server and is used to indicate a first backup server to send data in a preset range to the production execution server, the production execution server is a server in a production system, and the first backup server is a slave backup server in the backup system; and then sends the data in the preset range to the production execution server based on the child backup and restoration task.

In hardware implementation, the processing unit 1103 may be a processor, a processing circuit, or the like. The sending unit 1101 and the receiving unit 1102 may be coupled as a transceiver, a transceiver circuit, an interface circuit, or the like. The storage unit may be a memory. The processing unit, the sending unit, the receiving unit, and the storage unit may be integrated or separated.

Figure 12:
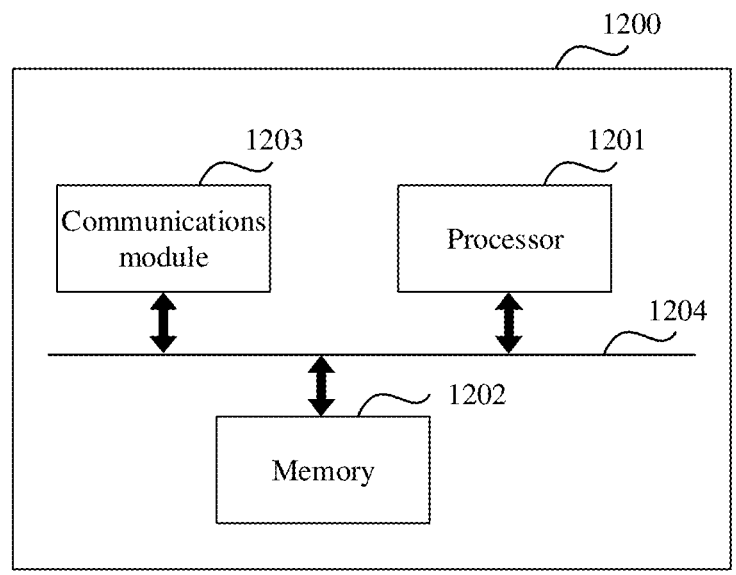
FIG. 12 is a schematic diagram of a hardware structure of a slave backup server according to an embodiment.

FIG. 12 is a possible schematic diagram of a hardware structure of a slave backup server related to the foregoing embodiment according to an embodiment. As shown in FIG. 12, the slave backup server 1200 may include one or more processors 1201, one or more memories 1202, and a communications module 1203 (for example, may be one or more transceivers). These components may be connected through a bus 1204 or in another manner. In FIG. 12, an example in which the components are connected through a bus is used.

The communications module 1203 may be configured to send a request generated by the processor 1201, for example, a generated request for obtaining to-be-backed-up data. The communications module 1203 may be further configured to receive information and data, for example, information about a child backup task and to-be-backed-up data.

The memory 1202 may be coupled to the processor 1201 through the bus 1204 or an input/output port, or the memory 1202 may be integrated with the processor 1201. The memory 1202 is configured to store various software programs and/or a plurality of groups of instructions or data. The memory 1202 may include a high-speed random access memory, and may further include a nonvolatile memory, for example, one or more magnetic disk storage devices, a flash memory device, or another nonvolatile solid-state storage device. The memory 1202 may store an operating system (which is briefly referred to as a system below), for example, an embedded operating system such as uCOS, VxWorks, or RTLinux.

The processor 1201 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to disclosed content. Alternatively, the processor may be a combination of processors implementing a determining function, for example, a combination of one or more microprocessors or a combination of a digital signal processor and a microprocessor.

In this embodiment, the processor 1201 may be configured to: read and execute computer readable instructions. The processor 1201 may be configured to: invoke a program stored in the memory 1202, for example, a program for implementing, on a side of the slave backup server 1200, the backup processing method provided in one or more embodiments, and execute instructions included in the program.

It should be noted that the slave backup server 1200 shown in FIG. 12 is merely an implementation of this embodiment. The slave backup server 1200 may further include more or fewer components. This is not limited herein. For implementation of the slave backup server 1200, refer to the related descriptions in the method embodiment shown in FIG. 3, FIG. 4, or FIG. 5 and the possible implementations thereof. Details are not described herein again. Alternatively, for implementation of the slave backup server 1200, refer to the related descriptions in the method embodiment shown in FIG. 6, FIG. 7, or FIG. 8 and the possible implementations thereof. Details are not described herein again.

Figure 13:
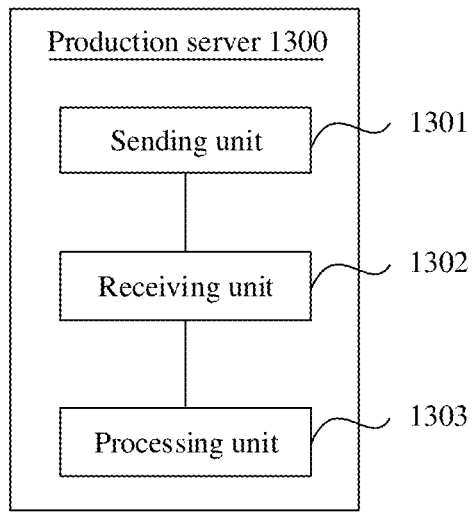
FIG. 13 is a schematic diagram of a logical structure of a production server according to an embodiment.

When each functional module is obtained through division based on each corresponding function, FIG. 13 is a possible schematic diagram of a logical structure of a production server related to the foregoing embodiment. The production server 1300 includes a sending unit 1301, a receiving unit 1302, and a processing unit 1303. For example, the sending unit 1301 is configured to support the production server in performing the step of sending information by the production server in the method embodiment shown in FIG. 3, FIG. 4, or FIG. 5 and the possible implementations thereof. The receiving unit 1302 is configured to support the production server in performing the step of receiving information by the production server in the method embodiment shown in FIG. 3, FIG. 4, or FIG. 5 and the possible implementations thereof. The processing unit 1303 is configured to support the production server in performing the step of obtaining to-be-backed-up data, obtaining distribution information of to-be-backed-up data, or obtaining a resource consumption status of the production server in the method embodiment shown in FIG. 3, FIG. 4, or FIG. 5 and the possible implementations thereof, a step other than the steps performed by the sending unit 1301 and the receiving unit 1302, and the like.

Optionally, the production server 1300 may further include a storage unit, configured to store a computer program or data. In a possible manner, the processing unit 1303 may invoke the computer program or the data in the storage unit, so that the production server 1300 obtains first preset information, where the first preset information includes one or more of first data distribution information and first resource consumption information, the first data distribution information includes a first distribution status of to-be-backed-up data on a first production server, and the first resource consumption information includes a first resource consumption status of the first production server; and then sends the first preset information to a master backup server, where the first preset information is used to enable the master backup server to obtain a plurality of child backup tasks through division based on the first preset information, the child backup task corresponds to a backup execution server and a production execution server and is used to indicate the backup execution server to back up to-be-backed-up data in a target range in the production execution server, the master backup server is a server in a backup system, and the backup system includes one or more master backup servers and one or more slave backup servers that are configured to back up data in a production system.

Optionally, the production server 1300 may further include a storage unit, configured to store a computer program or data. In a possible manner, the processing unit 1303 may invoke the computer program or the data in the storage unit, so that the production server 1300 obtains first information, where the first information includes first resource consumption statuses respectively corresponding to the plurality of production servers.

Then, the production server 1300 sends the first information to a master backup server, where the first information is used to enable the master backup server to obtain a plurality of child backup and restoration tasks through division based on the first information, the child backup and restoration task corresponds to a backup execution server and a production execution server and is used to indicate the backup execution server to send data in a preset range to the production execution server, the master backup server is a server in a backup system, and the backup system includes one or more master backup servers and one or more slave backup servers.

In hardware implementation, the processing unit 1303 may be a processor, a processing circuit, or the like. The sending unit 1301 and the receiving unit 1302 may be coupled as a transceiver, a transceiver circuit, an interface circuit, or the like. The storage unit may be a memory. The processing unit, the sending unit, the receiving unit, and the storage unit may be integrated or separated.

Figure 14:
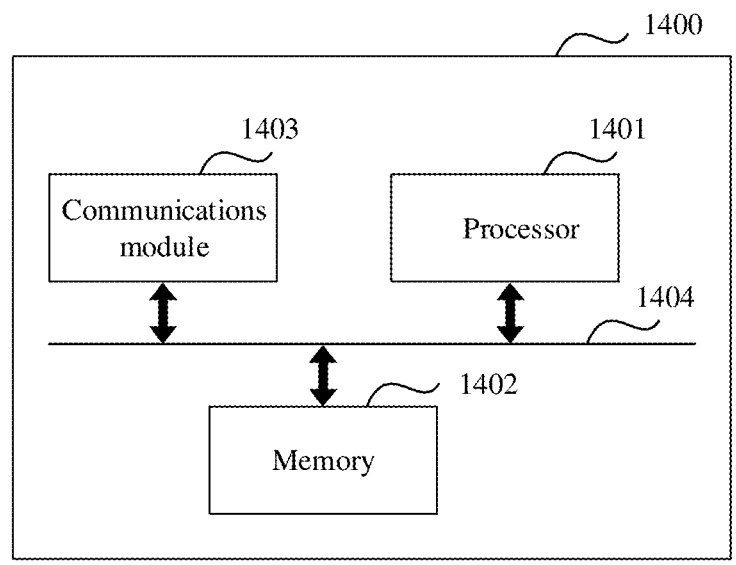
FIG. 14 is a schematic diagram of a hardware structure of a production server according to an embodiment.

FIG. 14 is a possible schematic diagram of a hardware structure of a production server related to the foregoing embodiment according to an embodiment. As shown in FIG. 14, the production server 1400 may include one or more processors 1401, one or more memories 1402, and a communications module 1403 (for example, may be one or more transceivers). These components may be connected through a bus 1404 or in another manner. In FIG. 14, an example in which the components are connected through a bus is used.

The communications module 1403 may be configured to send a request generated by the processor 1401, for example, a generated request for obtaining to-be-backed-up data. The communications module 1403 may be further configured to receive information and data, for example, information about a child backup task and to-be-backed-up data.

The memory 1402 may be coupled to the processor 1401 through the bus 1404 or an input/output port, or the memory 1402 may be integrated with the processor 1401. The memory 1402 is configured to store various software programs and/or a plurality of groups of instructions or data. The memory 1402 may include a high-speed random access memory, and may further include a nonvolatile memory, for example, one or more magnetic disk storage devices, a flash memory device, or another nonvolatile solid-state storage device. The memory 1402 may store an operating system (which is briefly referred to as a system below), for example, an embedded operating system such as uCOS, VxWorks, or RTLinux.

The processor 1401 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to disclosed content. Alternatively, the processor may be a combination of processors implementing a determining function, for example, a combination of one or more microprocessors or a combination of a digital signal processor and a microprocessor.

In this embodiment, the processor 1401 may be configured to: read and execute computer readable instructions. The processor 1401 may be configured to: invoke a program stored in the memory 1402, for example, a program for implementing, on a side of the production server 1400, the backup processing method provided in one or more embodiments, and execute instructions included in the program.

It should be noted that the production server 1400 shown in FIG. 14 is merely an implementation of this embodiment. The production server 1400 may further include more or fewer components. This is not limited herein. For implementation of the production server 1400, refer to the related descriptions in the method embodiment shown in FIG. 3, FIG. 4, or FIG. 5 and the possible implementations thereof. Details are not described herein again. Alternatively, for implementation of the production server 1400, refer to the related descriptions in the method embodiment shown in FIG. 6, FIG. 7, or FIG. 8 and the possible implementations thereof. Details are not described herein again.

An embodiment further provides a backup processing system, including a production system and a backup system. The production system includes a plurality of production servers, and the backup system includes one or more master backup servers and one or more slave backup servers. The master backup server may be the server in FIG. 9 or FIG. 10, the slave backup server may be the server in FIG. 11 or FIG. 12, and the production server may be the server in FIG. 13 or FIG. 14.

An embodiment further provides a computer readable storage medium. The computer readable storage medium stores a computer program, and the computer program is executed by a processor to implement the method embodiments in FIG. 3, FIG. 4, or FIG. 5 and the possible implementations thereof.

An embodiment further provides a computer readable storage medium. The computer readable storage medium stores a computer program, and the computer program is executed by a processor to implement the method embodiments in FIG. 6, FIG. 7, or FIG. 8 and the possible implementations thereof.

An embodiment further provides a computer program product. The computer program product is read and executed by a computer to implement the method embodiments in FIG. 3, FIG. 4, or FIG. 5 and the possible implementations thereof.

An embodiment further provides a computer program product. The computer program product is read and executed by a computer to implement the method embodiments in FIG. 6, FIG. 7, or FIG. 8 and the possible implementations thereof.

An embodiment further provides a computer program. When the computer program is executed on a computer, the computer is enabled to implement the method embodiments in FIG. 3, FIG. 4, or FIG. 5 and the possible implementations thereof.

An embodiment further provides a computer program. When the computer program is executed on a computer, the computer is enabled to implement the method embodiments in FIG. 6, FIG. 7, or FIG. 8 and the possible implementations thereof.

In conclusion, compared with the conventional technology in which when information about the production system is unknown, according to a simple balancing policy, an equal amount of to-be-backed-up data is required to be obtained from each production server for backup, and consequently internal consumption caused by forwarding between the production servers is heavy and performance of the server deteriorates, in the embodiments, a backup task of data in an entire production system is divided into a plurality of child backup tasks based on analysis results/an analysis result of pre-obtained data distribution information and/or pre-obtained resource consumption information in the production system, where each child backup task corresponds to a range of data that the child backup task is responsible for backing up. Then, the child backup tasks are distributed to respective corresponding backup execution server for data backup. Therefore, backup efficiency can be improved and load of the production server can be reduced. In addition, compared with the conventional technology in which only one backup server in a backup system is used to back up the data in the entire production system, in the embodiments, each backup server in the backup system is fully used to back up the data, so that backup efficiency is greatly improved.

In conclusion, the foregoing descriptions are merely example embodiments but are not intended to limit the scope of the embodiments. Any modification, equivalent replacement, or improvement made without departing from the principle shall fall within the protection scope of the embodiments.

What is claimed is:

1. A backup processing method performed by a master backup server in a plurality of backup servers, comprising:
   dividing a backup task into a plurality of child backup tasks based upon real-time analysis of both a data distribution status and a resource consumption status of each backup server;
   allocating each child backup task to each backup server of the plurality of backup servers; and
   sending the plurality of child backup tasks to respective corresponding backup servers.

2. The backup processing method according to claim 1, further comprising:
   obtaining first preset information, wherein the first preset information comprises both the data distribution status and the resource consumption status of a plurality of production servers; and dividing the backup task into the plurality of child backup tasks based on the first preset information, wherein each child backup task corresponds to one production server.

3. The backup processing method according to claim 1, further comprising:
setting a backup rate corresponding to each child backup task, to indicate each backup server to back up data at the backup rate.

4. A backup and restoration processing method performed by a master backup server in a plurality of backup servers, comprising:
dividing a backup and restoration task into a plurality of child backup and restoration tasks based upon real-time analysis of both a data distribution status and a resource consumption status of each backup server;
allocating each child backup and restoration task to each backup server of the plurality of backup servers; and
sending the plurality of child backup and restoration tasks to respective corresponding backup servers.

5. The backup processing method according to claim 4, further comprising:
obtaining second preset information, wherein the second preset information comprises resource consumption statuses of a plurality of production devices; and
dividing the backup and restoration task into the plurality of child backup and restoration tasks based on the second preset information, wherein each child backup and restoration task corresponds to one production device.

6. The backup processing method according to claim 4, further comprising:
setting a backup and restoration rate corresponding to each child backup and restoration task, to indicate each backup server to restore data at the backup and restoration rate.

7. A backup processing server, wherein the backup processing server is a master backup server in a backup system including a plurality of backup servers, and the backup processing server comprises:
a memory,
a processor coupled to the memory and configured to:
divide a backup task into a plurality of child backup tasks based upon real-time analysis of both a data distribution status and a resource consumption status of each backup server;
allocate each child backup task to each backup server of the plurality of backup servers; and
send the plurality of child backup tasks to respective corresponding backup servers.

8. The backup processing server according to claim 7, wherein the processor is further configured to:
obtain first preset information, wherein the first preset information comprises both the data distribution status and the resource consumption status of a plurality of production servers, and
divide the backup task into the plurality of child backup tasks based on the first preset information, wherein each child backup task corresponds to one production server.

9. The backup processing server according to claim 7, wherein the processor is further configured to set a backup rate corresponding to each child backup task, to indicate each backup server to back up data at the backup rate.

10. A backup and restoration processing server, comprising:
a memory,
a processor coupled to the memory and configured to:
divide a backup and restoration task into a plurality of child backup and restoration tasks based upon real-time analysis of both a data distribution status and a resource consumption status of each backup server;
allocate each child backup and restoration task to each backup server of a plurality of backup servers in a backup system, wherein the plurality of backup servers comprises the backup and restoration processing server; and
send the plurality of child backup and restoration tasks to respective corresponding backup servers in the plurality of backup servers.

11. The backup and restoration processing server according to claim 10, wherein the processor is further configured to:
obtain second preset information, wherein the second preset information comprises resource consumption statuses of a plurality of production devices, and
divide the backup and restoration task into the plurality of child backup and restoration tasks based on the second preset information, wherein each child backup and restoration task corresponds to a respective production device of the plurality of production devices.

12. The backup and restoration processing server according to claim 10, wherein the processor is further configured to set a backup and restoration rate corresponding to each child backup and restoration task, to indicate each backup server to restore data at the backup and restoration rate.

* * * * *